US012701462B2

(12) United States Patent
Sangwan et al.

(10) Patent No.: US 12,701,462 B2
(45) Date of Patent: Aug. 4, 2026

(54) FAST DATA TRANSFER IN PERIPHERAL DEVICE NETWORKS

(71) Applicant: QUALCOMM Incorporated, San Diego, CA (US)

(72) Inventors: Rahul Sangwan, Charkhi Dadri (IN); Robin Robin, Noida (IN); Deep Shikha Aggarwal, Gurugram (IN); Nicolas Graube, Cambridge (GB); Randhir Kumar, New Delhi (IN); Sonu Lnu, Faridabad (IN); Maitreyi Gupta, Delhi (IN); Anand Mohan Singh, Ghaziabadd (IN)

(73) Assignee: Qualcomm Incorporated, San Diego, CA (US)

( * ) Notice: Subject to any disclaimer, the term of this patent is extended or adjusted under 35 U.S.C. 154(b) by 321 days.

(21) Appl. No.: 18/461,906

(22) Filed: Sep. 6, 2023

(65) Prior Publication Data

US 2025/0081035 A1     Mar. 6, 2025

(51) Int. Cl.
| | |
|---|---|
| *H04W 28/04* | (2009.01) |
| *H04L 1/08* | (2006.01) |
| *H04W 28/06* | (2009.01) |

(52) U.S. Cl.
CPC .............. *H04W 28/04* (2013.01); *H04L 1/08* (2013.01); *H04W 28/065* (2013.01)

(58) Field of Classification Search
CPC . G06F 8/65; H04L 1/08; H04L 65/611; H04L 65/762; H04L 67/12; H04L 65/75; H04W 28/04; H04W 28/065
See application file for complete search history.

(56) References Cited

U.S. PATENT DOCUMENTS

| | | | | |
|---|---|---|---|---|
| 8,787,210 | B2 | 7/2014 | Picard | |
| 2002/0065631 | A1* | 5/2002 | Loechner | G05B 19/4185 702/62 |
| 2013/0208627 | A1* | 8/2013 | Picard | G01D 4/006 370/255 |
| 2015/0121359 | A1* | 4/2015 | Osterloh | H04L 12/1868 717/172 |
| 2020/0286135 | A1* | 9/2020 | Matayoshi | G09F 3/204 |

OTHER PUBLICATIONS

International Search Report and Written Opinion—PCT/US2024/042338—ISA/EPO—Nov. 5, 2024.

* cited by examiner

*Primary Examiner* — Khoa Huynh

(74) *Attorney, Agent, or Firm* — Gerald P. Joyce, III

(57) ABSTRACT

Disclosed are systems and techniques for wireless communications. For example, a network device can divide a data package into a plurality of segments. The network device can transmit, to a plurality of wireless communication devices, a broadcast message indicating a first time to start receiving a plurality of subframes comprising the plurality of segments, a total number of the plurality of segments, and a total number of the plurality of subframes for the data package. The network device can transmit, to the plurality of wireless communication devices starting at the first time, the plurality of subframes comprising the plurality of segments.

32 Claims, 9 Drawing Sheets

700

500

700

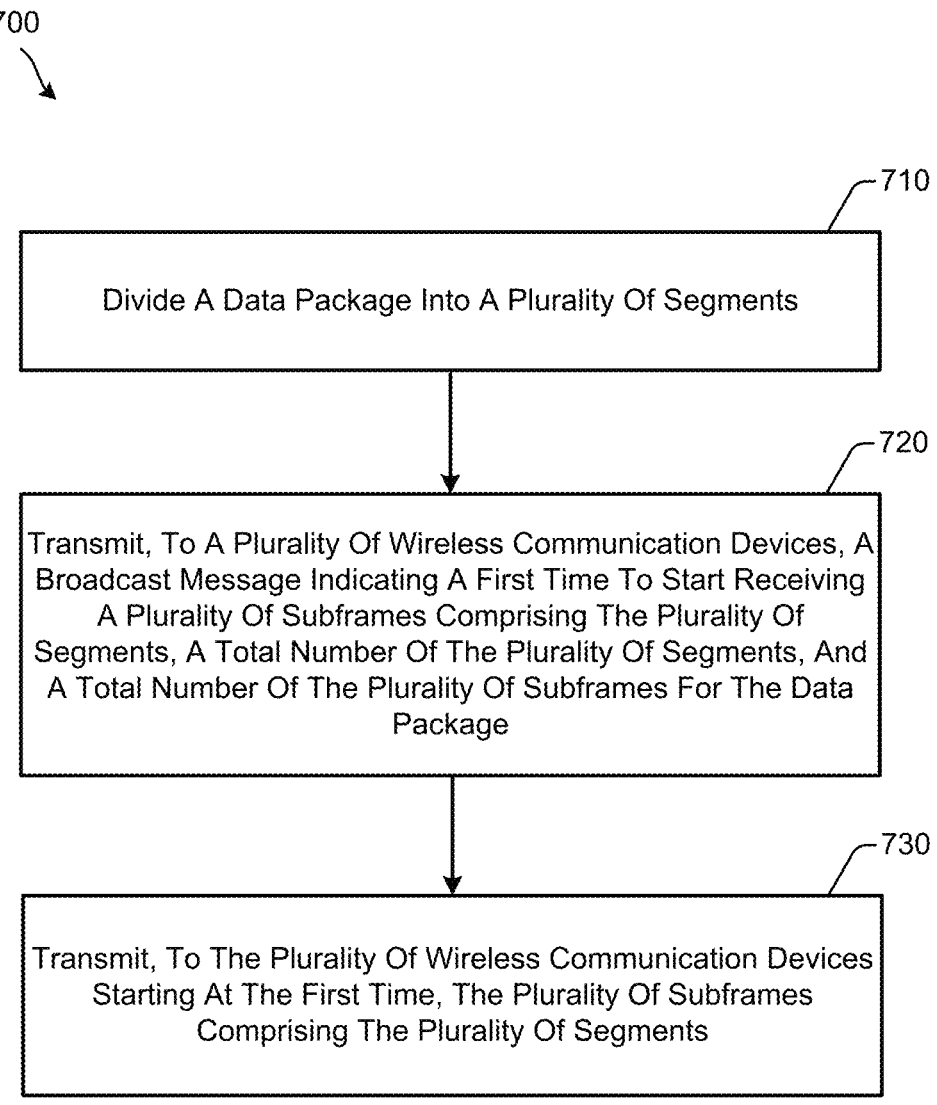

710

Divide A Data Package Into A Plurality Of Segments

720

Transmit, To A Plurality Of Wireless Communication Devices, A Broadcast Message Indicating A First Time To Start Receiving A Plurality Of Subframes Comprising The Plurality Of Segments, A Total Number Of The Plurality Of Segments, And A Total Number Of The Plurality Of Subframes For The Data Package

730

Transmit, To The Plurality Of Wireless Communication Devices Starting At The First Time, The Plurality Of Subframes Comprising The Plurality Of Segments

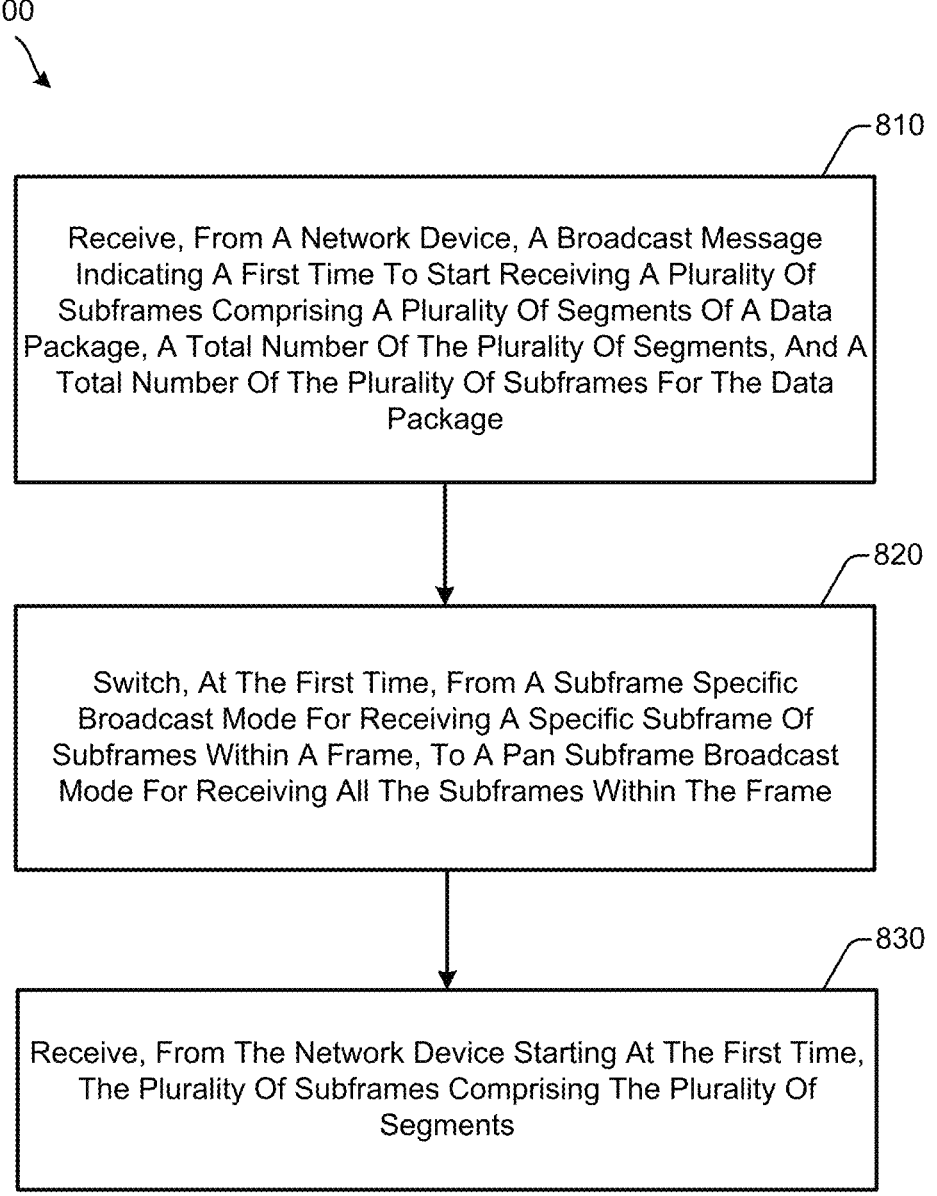

810

Receive, From A Network Device, A Broadcast Message Indicating A First Time To Start Receiving A Plurality Of Subframes Comprising A Plurality Of Segments Of A Data Package, A Total Number Of The Plurality Of Segments, And A Total Number Of The Plurality Of Subframes For The Data Package

820

Switch, At The First Time, From A Subframe Specific Broadcast Mode For Receiving A Specific Subframe Of Subframes Within A Frame, To A Pan Subframe Broadcast Mode For Receiving All The Subframes Within The Frame

830

Receive, From The Network Device Starting At The First Time, The Plurality Of Subframes Comprising The Plurality Of Segments

FIG. 8

FAST DATA TRANSFER IN PERIPHERAL DEVICE NETWORKS

FIELD OF THE DISCLOSURE

The present disclosure generally relates to wireless communications. For example, aspects of the present disclosure relate to systems and techniques for providing fast data transfer (e.g., over the air (OTA) data transfer) in peripheral device networks, including peripheral devices, such as BLU- ETOOTH® (BT) electronic shelf labels (ESLs).

BACKGROUND OF THE DISCLOSURE

Short range wireless communication enables wireless communication over relatively short distances (e.g., within thirty meters). For example, BLUETOOTH® is a wireless technology standard for exchanging data over short distances using short-wavelength ultra-high frequency (UHF) radio waves from 2.4 gigahertz (GHz) to 2.485 GHz.

BLUETOOTH® Low Energy (BLE) is a form of BLU- ETOOTH® communication that allows for communication with devices running on low power. Such devices may include beacons, which are wireless communication devices that may use low-energy communication technology for positioning, proximity marketing, or other purposes. In some cases, such devices may serve as nodes (e.g., relay nodes) of a wireless mesh network that communicates and/or relays information to a managing platform or hub associated with the wireless mesh network.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for wireless communications. According to at least one illustrative example, a network device for wireless communication is provided. The network device includes at least one memory and at least one processor coupled to the at least one memory and configured to: divide a data package into a plurality of segments; output, for transmission to a plurality of wireless communication devices, a broadcast message indicating a first time to start receiving a plurality of subframes comprising the plurality of segments, a total number of the plurality of segments, and a total number of the plurality of subframes for the data package; and output, for transmission to the plurality of wireless communication devices starting at the first time, the plurality of subframes comprising the plurality of segments.

In another illustrative example, a method of wireless communication performed at a network device is provided. The method includes: dividing, by the network device, a data package into a plurality of segments; transmitting, by the network device to a plurality of wireless communication devices, a broadcast message indicating a first time to start receiving a plurality of subframes comprising the plurality of segments, a total number of the plurality of segments, and a total number of the plurality of subframes for the data package; and transmitting, by the network device to the plurality of wireless communication devices starting at the first time, the plurality of subframes comprising the plurality of segments.

In another illustrative example, a non-transitory computer-readable storage medium is provided that includes instructions stored thereon which, when executed by at least one processor, causes the at least one processor to: divide a data package into a plurality of segments; output, for transmission to a plurality of wireless communication devices, a broadcast message indicating a first time to start receiving a plurality of subframes comprising the plurality of segments, a total number of the plurality of segments, and a total number of the plurality of subframes for the data package; and output, for transmission to the plurality of wireless communication devices starting at the first time, the plurality of subframes comprising the plurality of segments.

In another illustrative example, an apparatus for wireless communication is provided that includes: means for dividing a data package into a plurality of segments; means for transmitting, to a plurality of wireless communication devices, a broadcast message indicating a first time to start receiving a plurality of subframes comprising the plurality of segments, a total number of the plurality of segments, and a total number of the plurality of subframes for the data package; and means for transmitting, to the plurality of wireless communication devices starting at the first time, the plurality of subframes comprising the plurality of segments.

In another illustrative example, a wireless communication device for wireless communication is provided. The wireless communication device includes at least one memory and at least one processor coupled to the at least one memory and configured to: receive, from a network device, a broadcast message indicating a first time to start receiving a plurality of subframes comprising a plurality of segments of a data package, a total number of the plurality of segments, and a total number of the plurality of subframes for the data package; switch, at the first time, from a subframe specific broadcast mode for receiving a specific subframe of subframes within a frame, to a pan subframe broadcast mode for receiving all the subframes within the frame; and receive, from the network device starting at the first time, the plurality of subframes comprising the plurality of segments.

In another illustrative example, a method of wireless communication performed at a wireless communication device is provided. The method includes: receiving, by the wireless communication device from a network device, a broadcast message indicating a first time to start receiving a plurality of subframes comprising a plurality of segments of a data package, a total number of the plurality of segments, and a total number of the plurality of subframes for the data package; switching, by the wireless communication device at the first time, from a subframe specific broadcast mode for receiving a specific subframe of subframes within a frame, to a pan subframe broadcast mode for receiving all the subframes within the frame; and receiving, by the wireless communication device from the network device starting at the first time, the plurality of subframes comprising the plurality of segments.

In another illustrative example, a non-transitory computer-readable storage medium is provided that includes instructions stored thereon which, when executed by at least one processor, causes the at least one processor to: receive, from a network device, a broadcast message indicating a first time to start receiving a plurality of subframes comprising a plurality of segments of a data package, a total number of the plurality of segments, and a total number of the plurality of subframes for the data package; switch, at the first time, from a subframe specific broadcast mode for receiving a specific subframe of subframes within a frame, to a pan subframe broadcast mode for receiving all the subframes within the frame; and receive, from the network device starting at the first time, the plurality of subframes comprising the plurality of segments.

In another illustrative example, an apparatus for wireless communication is provided that includes: means for receiving, from a network device, a broadcast message indicating a first time to start receiving a plurality of subframes comprising a plurality of segments of a data package, a total number of the plurality of segments, and a total number of the plurality of subframes for the data package; means for switching, at the first time, from a subframe specific broadcast mode for receiving a specific subframe of subframes within a frame, to a pan subframe broadcast mode for receiving all the subframes within the frame; and means for receiving, from the network device starting at the first time, the plurality of subframes comprising the plurality of segments.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a flow chart illustrating an example of a process for wireless communications at a network device, such as an access point, in accordance with some aspects of the present disclosure.

FIG. 8 is a flow chart illustrating an example of a process for wireless communications at a wireless communication device, such as an ESL, in accordance with some aspects of the present disclosure.

DETAILED DESCRIPTION

Figure 1:
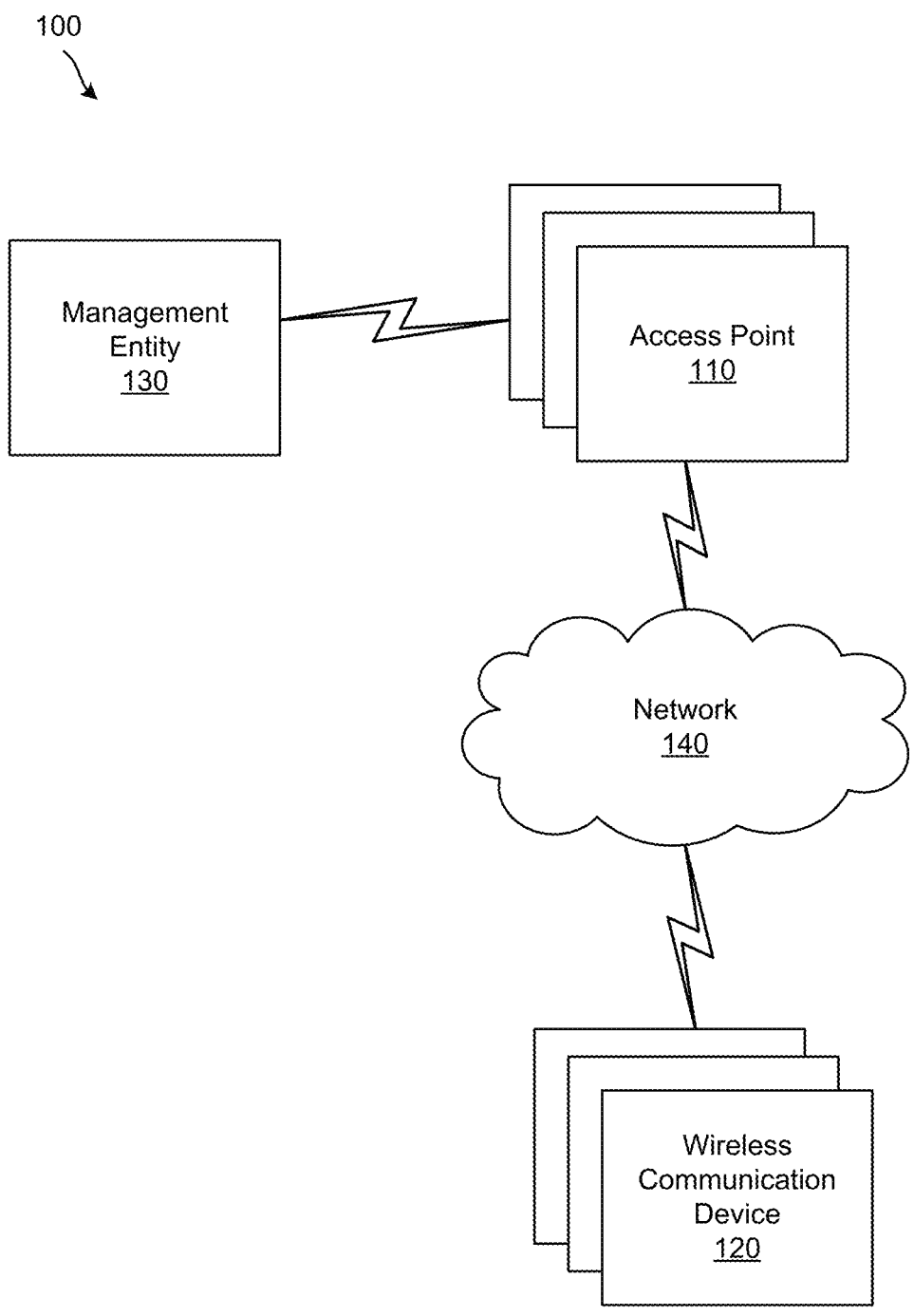
FIG. 1 is a diagram illustrating an example environment in which systems and/or methods described herein may be implemented, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

A system may include one or more wireless communication devices that are controlled by a network entity. For example, a system including multiple peripheral devices (e.g., an electronic shelf label (ESL) system) may include one or more wireless communication devices (e.g., peripheral devices, such as ESLs) that are controlled by a network entity, such as a management entity (ME), via at least one additional network entity, such as an access point (AP). As used herein, the terms "network entity" and "network device" may be interchangeable. For example, an AP can be referred to as an example of a "network entity" and/or can be referred to as an example of a "network device." A "network entity" can include an AP, an ME, and/or a combination of the two. A "network device" can include an AP, an ME, and/or a combination of the two. In some examples, a single device can implement the functionality of an ME and an AP (e.g., an ME and an AP can be combined in a single device).

In one or more examples, to facilitate control by the ME, each peripheral device (e.g., ESL) may have a wireless connection (e.g., a BLUETOOTH® Low Energy (BLE) connection or other connection) to AP that is communicatively connected to the ME (e.g., via the Internet, such as wirelessly, via an Ethernet connection, etc.). In some cases, commands from the ME may be wirelessly transmitted to the peripheral devices (e.g., ESLs) by the AP. Responses or information from the peripheral devices may also be received by the AP and provided by the AP to the ME.

Each AP may have an associated channel map. A channel map is a listing of frequency channels to be utilized or, conversely, not to be utilized (e.g., in the context of modification of frequency hopping sequences) by an AP for communication, such as with the ESLs or other peripheral devices. While examples are described herein using ESLs as illustrative examples of wireless communication devices, a management entity as an example of a network entity, and access points as examples of network entities, the systems and techniques described herein are applicable to any type of system or network.

In ESL systems, periodic Advertisements (PAs) can be utilized to provide regular and predictable payload transmissions from a central device (e.g., which may be in the form of a network device, such as an AP) to one or more peripheral devices (e.g., which may each be in the form of a wireless communication device, such as an ESL or other peripheral device). For example, PAs can be used to issue information from a central device to multiple peripheral devices, which may be within one or more groups of peripheral devices. PAs are generally unidirectional (e.g., unidirectional transmissions) such that PAs are transmitted only one-way from a central device to one or more peripheral devices.

Periodic Advertisement with Response (PAwR) can be used for ESL systems to provide bidirectionality (e.g., bidirectional transmissions between a central device and one or more peripheral devices). Peripheral devices synchronized within a group of peripheral devices can be addressed by a central device on a synchronized channel (e.g., a radio frequency (RF) channel between the central device and the peripheral devices) whenever the central device determines to send (e.g., transmit) a request to the peripheral devices. In some cases, as used herein, a synchronized channel refers to a channel on which transmissions are synchronized (in time). For example, the channel can utilize or can be based on a frequency on which one or more communications are transmitted. A hopping frequency sequence (HFS) can be associated with the channel. In some cases, the HFS may progress at a fixed and/or pre-determined interval. In some cases, a channel map may change, such as if interference on one or more channels changes, in which case the HFS can be updated (there may not be a fixed interval). In such cases, a minimum time between updates of a HFS can be applied, which can avoid updating the HFS too frequently. A central device and one or more peripheral devices can concurrently track the sequence at a predefined frequency hopping pattern or sequence (e.g., so the central device knows when to transmit the request and the peripheral devices know when to listen for and/or receive the request).

A request transmitted by a central device to peripheral devices in a particular group may be a PA containing a synchronization message transmitted by the central device on the synchronized channel to the peripheral devices of the particular group. For example, wireless communication devices within the particular group can wake up (e.g., from a low power (LP) mode) at the same PA transmission with respect to a particular PAwR train for that group. A PA is made up of a periodic set of transmissions, where the collection of transmissions is collectively referred to as a PA train or a PAwR train when applied to PAwR. Each transmission of a PA train (or PAwR train) occurs at a precise point in time, with fixed intervals between the transmissions. A communication channel (e.g., one communication channel out of thirty-seven available communication channels) is selected for each of the transmissions, where the communication channel follows a hopping frequency sequence. The synchronization between the central device and the peripheral devices in the group is based on the periodicity of the PA. The periodically-transmitted messages (e.g., the synchronization messages) include zero, one, or more commands (e.g., a respective operational code (OpCode) and parameters associated with each command). If a response from a peripheral device is expected by the central device (e.g., the synchronization message from the central device requests a response from a specific peripheral device), the particular peripheral device will respond in a specific response slot, based on where the peripheral device appeared within a sequence contained within the synchronization message transmitted by the central device.

For an ESL system, in the PAwR specification, a synchronized peripheral device (e.g., an ESL) may transmit a response (e.g., a response message including an AUX_SYNC_SUBEVENT_RSP packet) when instructed (e.g., requested) by its host (e.g., a management entity). The response slot (e.g., time slot) for the synchronized peripheral device (e.g., the ESL) to send (e.g., transmit) the response is determined by the host (e.g., the management entity). Whether or not the synchronized peripheral device sends a response and at which response slot the synchronized peripheral device sends the response are all determined by the host. In an ESL system, it is generally the host (e.g., the management entity) that decides how and when the synchronized peripheral devices (e.g., ESLs) send their responses.

In some cases, a central device (e.g., a network device, which may be in the form of an access point) may need to send (e.g., transmit) a large data package to multiple wireless communication devices (e.g., ESLs) (e.g., the same data package sent to the multiple wireless communication devices). The data package may contain any type of data. In some examples, the data package may be a firmware update (FWUP), which may consist of a firmware update image. Typically, a central (e.g., an access point) will send (e.g., transmit) a large data package to a wireless communication device (e.g., an ESL) via a direct connection with the wireless communication device (e.g., which may be referred to as a direct connection data transfer method) because of the large size of the data package. In a peripheral device network (e.g., a wireless communication device network, such as an ESL network) including hundreds or thousands of peripheral devices (e.g., wireless communication devices, such as ESLs), this direct connection data transfer method of transferring large data packages can require a large amount of time because the central (e.g., an access point) is only capable of supporting a certain number of parallel connections (e.g., one-to-one connections, each connection being between the central and one of the wireless communication devices) at a time. As such, this direct connection data transfer method for transferring data is limited by the number of parallel connections that a central (e.g., an access point) can support and, as such, is not easily scalable.

The existing AP synchronization broadcast (e.g., PA containing a synchronization message) is subframe specific, meaning that a particular wireless communication device (e.g., ESL) can only receive a message transmitted within a subframe that the wireless communication device is subscribed. As such, under this existing method, if a central (e.g., a network device, such as an access point) uses broadcasting as a mechanism to transfer large data packages (e.g., divided into segments) to a plurality of wireless communication devices (e.g., ESLs), the central (e.g., access point) will need to manage the segments transmitted per subframe, which would not be very time efficient.

As such, an improved procedure that allows for a fast data transfer of a large data package (e.g., a firmware update) from a network device (e.g., an access point) to a plurality of wireless communication devices (e.g., ESLs) can be beneficial.

In one or more aspects of the present disclosure, systems, apparatuses, methods (also referred to as processes), and computer-readable media (collectively referred to herein as "systems and techniques") are described herein that provide for data transfer in peripheral device networks, such as wireless communication device networks (e.g., ESL networks). The systems and techniques allow for a network device (e.g., an access point) to divide a large data package (e.g., a firmware update) into a plurality of segments, and to send (e.g., transmit) the segments to wireless communication devices (e.g., ESLs) via a broadcast.

The systems and techniques provide a pan subframe broadcast mechanism to allow for network devices (e.g., access points) to perform faster transfers of large data packages to wireless communication devices (e.g., ESLs). The mechanism allows for wireless communication devices (e.g., ESLs) to switch from an existing subframe specific broadcast mode (e.g., to only receive messages transmitted in their subscribed subframe) to a pan subframe broadcast mode to be able to receive messages transmitted within all subframes (e.g., including the subframes that they are subscribed).

As previously mentioned, PAwR allows for wireless communication devices (e.g., ESLs) to synchronize with a network device (e.g., an access point), and to be able to respond to the periodic transmissions (PA) sent from the network device. A network device (e.g., access point) is able to broadcast messages, which are typically subframe bound. These broadcast messages transmitted by the network device can only be received by wireless communication devices (e.g., ESLs) that are subscribed on that particular subframe (e.g., when the wireless communication devices are operating a normal mode, which is a subframe specific broadcast mode).

When the wireless communication devices (e.g., ESLs) are synchronized to the network (e.g., access point), the wireless communication devices have access to the channel map being used by the network device (e.g., access point) as well as to related diversifiers, which can include an event counter and subframe number for the current subframe. The network device (e.g., access point) can select the channel (e.g., aux channel) to be used for a particular subframe based on the channel map and the diversifiers. Since the wireless communication devices (e.g., ESLs) have access to the channel map being used by the network device (e.g., access point) and the diversifiers, the wireless communication devices (e.g., ESLs) can use this information to determine the transmission (Tx) channels being used for all of the subframes (e.g., including the subframes that they are not subscribed on). The wireless communication devices (e.g., when switched to the pan subframe broadcast mode) can tune to those transmission channels during those subframes to receive messages (e.g., which may include large data packages) on all of the subframes transmitted by the network device.

The systems and techniques leverage this pan subframe broadcast mechanism (along with built-in retransmissions to correct for any missed data packets during the data transfer) to allow for a fast data transfer of large data packages from a network device (e.g., an access point) to a plurality of wireless communication devices (e.g., ESLs). This pan subframe broadcast mechanism can be used for the transfer of any type of large data packages, which may include firmware updates or any other bulk-data transfer activity destined for the wireless communication devices (e.g., ESLs). When the wireless communication devices (e.g., ESLs) are operating in the pan subframe broadcast mode, the wireless communication devices (e.g., ESLs) can receive transmissions from the network device (e.g., access point) on all subframes.

In one or more examples, the wireless communication devices (e.g., ESLs) can operate in the pan subframe broadcast mode for a limited duration of time. When the wireless communication devices (e.g., ESLs) are operating in the pan subframe broadcast mode, the wireless communication devices (e.g., ESLs) will forgo their specific wake-up schedule to scan for messages only on their subscribed subframe and, instead, will follow the full PAWR rate and scan for messages on all subframes. During the time that the wireless communication devices (e.g., ESLs) are operating in the pan subframe broadcast mode, the wireless communication devices (e.g., ESLs) will be able to accumulate all of the segments containing data for a data transfer at a much higher rate, than if wireless communication devices (e.g., ESLs) were operating in their normal subframe specific broadcast mode.

In one or more examples, the wireless communication devices (e.g., ESLs) may subsequently (e.g., after the wireless communication devices have received the full data package) receive a message (e.g., a broadcast command) from the network device (e.g., an access point) indicating that the wireless communication devices (e.g., ESLs) apply the received data package (e.g., apply the firmware update)

once the full data package is received or at a specific time (e.g., to coordinate a start time of the update after the transfer of the data package).

Additional aspects of the present disclosure are described in more detail below.

FIG. 1 is a diagram of an example environment 100 in which systems and/or methods described herein may be implemented. As shown in FIG. 1, the environment 100 may include at least one access point (AP) 110, at least one wireless communication device 120, a management entity (ME) 130, and a network 140. Devices of the environment 100 may interconnect via wired connections, wireless connections, or a combination of wired and wireless connections.

The access point 110 may include one or more devices capable of receiving, generating, storing, processing, providing, and/or routing information associated with access point synchronization and/or handover, as described elsewhere herein. The access point 110 may include a communication device and/or a computing device. The access point 110 may be configured to transmit beacons (e.g., BLE beacons), as well as to scan and locate other devices (e.g., other devices communicating using BLE protocols).

The wireless communication device 120 may include one or more devices capable of receiving, generating, storing, processing, and/or providing information associated with access point synchronization and/or handover, as described elsewhere herein. The wireless communication device 120 may include a communication device and/or a computing device. In some aspects, the wireless communication device 120 may be, may include, or may be included in an electronic shelf label (ESL).

The management entity 130 includes one or more devices capable of receiving, generating, storing, processing, providing, and/or routing information associated with access point synchronization and/or handover, as described elsewhere herein. The management entity 130 may include a communication device and/or a computing device. For example, the management entity 130 may include a server, such as an application server, a client server, a web server, a database server, a host server, a proxy server, a virtual server (e.g., executing on computing hardware), or a server in a cloud computing system. In some aspects, the management entity 130 includes computing hardware used in a cloud computing environment. The management entity 130 may provide control of a system (e.g., an ESL system) that includes the access point(s) 110, the wireless communication device(s) 120, and/or other device(s). The access point(s) 110 may be communicatively connected to the management entity 130 via a network (not shown), such as the Internet.

The network 140 may include one or more wireless networks. For example, the network 140 may include a personal area network (e.g., a Bluetooth network). The network 140 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
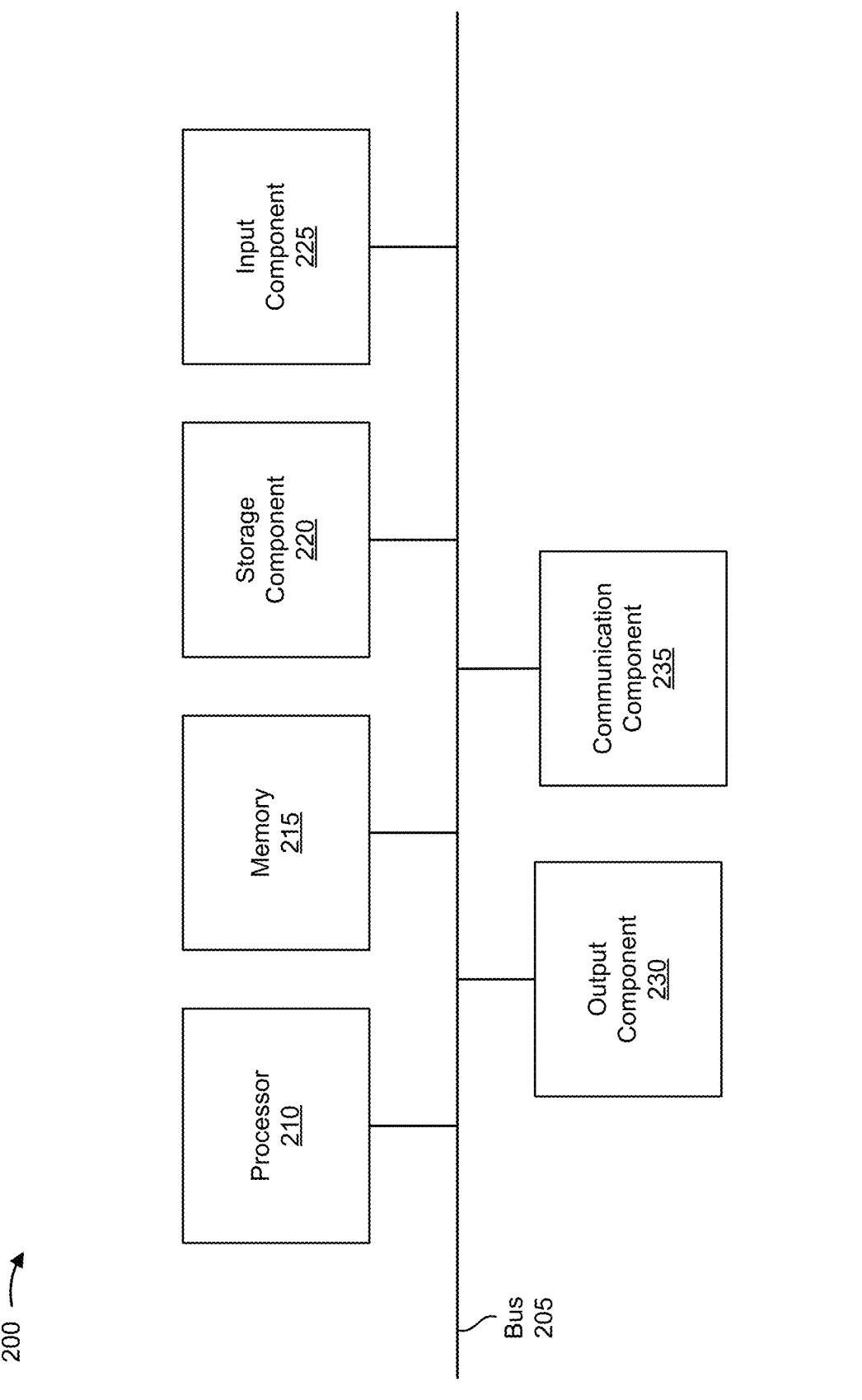
FIG. 2 is a diagram illustrating example components of a device, in accordance with some aspects of the present disclosure.

FIG. 2 is a diagram illustrating example components of a device 200, in accordance with the present disclosure. Device 200 may correspond to access point 110, wireless communication device 120, and/or management entity 130. In some aspects, access point 110, wireless communication device 120, and/or management entity 130 may include one or more devices 200 and/or one or more components of device 200. As shown in FIG. 2, device 200 may include a bus 205, a processor 210, a memory 215, a storage component 220, an input component 225, an output component 230, and/or a communication component 235.

Bus 205 may include a component that permits communication among the components of device 200. Processor 210 may be implemented in hardware, firmware, or a combination of hardware and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 may include one or more processors capable of being programmed to perform a function. Memory 215 may include a random access memory (RAM), a read only memory (ROM), and/or another type of dynamic or static storage device (e.g., a flash memory, a magnetic memory, and/or an optical memory) that stores information and/or instructions for use by processor 210.

Storage component 220 can store information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 may include a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 can include a component that provides output information from device 200 (e.g., a display, a speaker, a haptic feedback component, and/or an audio or visual indicator).

Communication component 235 may include one or more transceiver-like components (e.g., a transceiver and/or a separate receiver and transmitter) that enables device 200 to communicate with other devices, such as via a wired connection, a wireless connection, or a combination of wired and wireless connections. Communication component 235 may permit device 200 to receive information from another device and/or provide information to another device. For example, communication component 235 may include an Ethernet interface, an optical interface, a coaxial interface, an infrared interface, a radio frequency interface, a universal serial bus (USB) interface, a wireless local area interface (e.g., a Wi-Fi interface or a BLE interface), and/or a cellular network interface.

Communication component 235 may include one or more antennas for receiving wireless radio frequency (RF) signals transmitted from one or more other devices, cloud networks, and/or the like. The antenna may be a single antenna or an antenna array (e.g., antenna phased array) that can facilitate simultaneous transmit and receive functionality. The antenna may be an omnidirectional antenna such that signals can be received from and transmitted in all directions. The wireless signals may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network.

The one or more transceiver-like components (e.g., a wireless transceiver) of the communication component 235 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals into a baseband or intermediate frequency and can convert the RF signals to the digital domain.

In some cases, a CODEC may be implemented (e.g., by the processor 210) to encode and/or decode data transmitted and/or received using the one or more wireless transceivers. In some cases, encryption-decryption may be implemented (e.g., by the processor 210) to encrypt and/or decrypt data (e.g., according to the Advanced Encryption Standard (AES) and/or Data Encryption Standard (DES) standard) transmitted and/or received by the one or more wireless transceivers.

In some aspects, device 200 may represent an ESL. The ESL may include a battery in addition to the aforementioned components. In some aspects, the output component 230 of the ESL may be an electronic paper (e-paper) display or a liquid crystal display (LCD).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication component 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

As previously mentioned, in ESL systems, PAs (e.g., PAwR messages) are often utilized to provide regular and predictable payload transmissions from a central device (e.g., which may be in the form of a network device, such as an access point) to one or more peripheral devices (e.g., which may each be in the form of a wireless communication device, such as an ESL). PAwR messages can be used to issue information from a central device to multiple peripheral devices, which may be within one or more groups of peripheral devices. PAwR messages are unidirectional (e.g., unidirectional transmissions) such that PAwR messages are transmitted only one-way from a central device to zero or more peripheral devices (e.g., where in some cases at least one device may receive a PAwR message and in other cases no devices receive the PAwR message).

Periodic Advertisement with Response (PAwR) was introduced to ESL systems to provide bidirectionality (e.g., bidirectional transmissions between a central device and one or more peripheral devices). Peripheral devices synchronized within a group of peripheral devices can be addressed by a central device on a synchronized channel (e.g., a synchronized frequency channel between the central device and the peripheral devices) whenever the central device determines to send (e.g., transmit) a request (e.g., a PAwR message containing a synchronization message transmitted on the synchronized channel) to the peripheral devices. If a response from a peripheral device is expected by the central device (e.g., the synchronization message from the central device requests a response from a specific peripheral device), the particular peripheral device will respond in a specific response slot, where the response slot may be identified through the request contained within the synchronization message transmitted by the central device.

Figure 3:
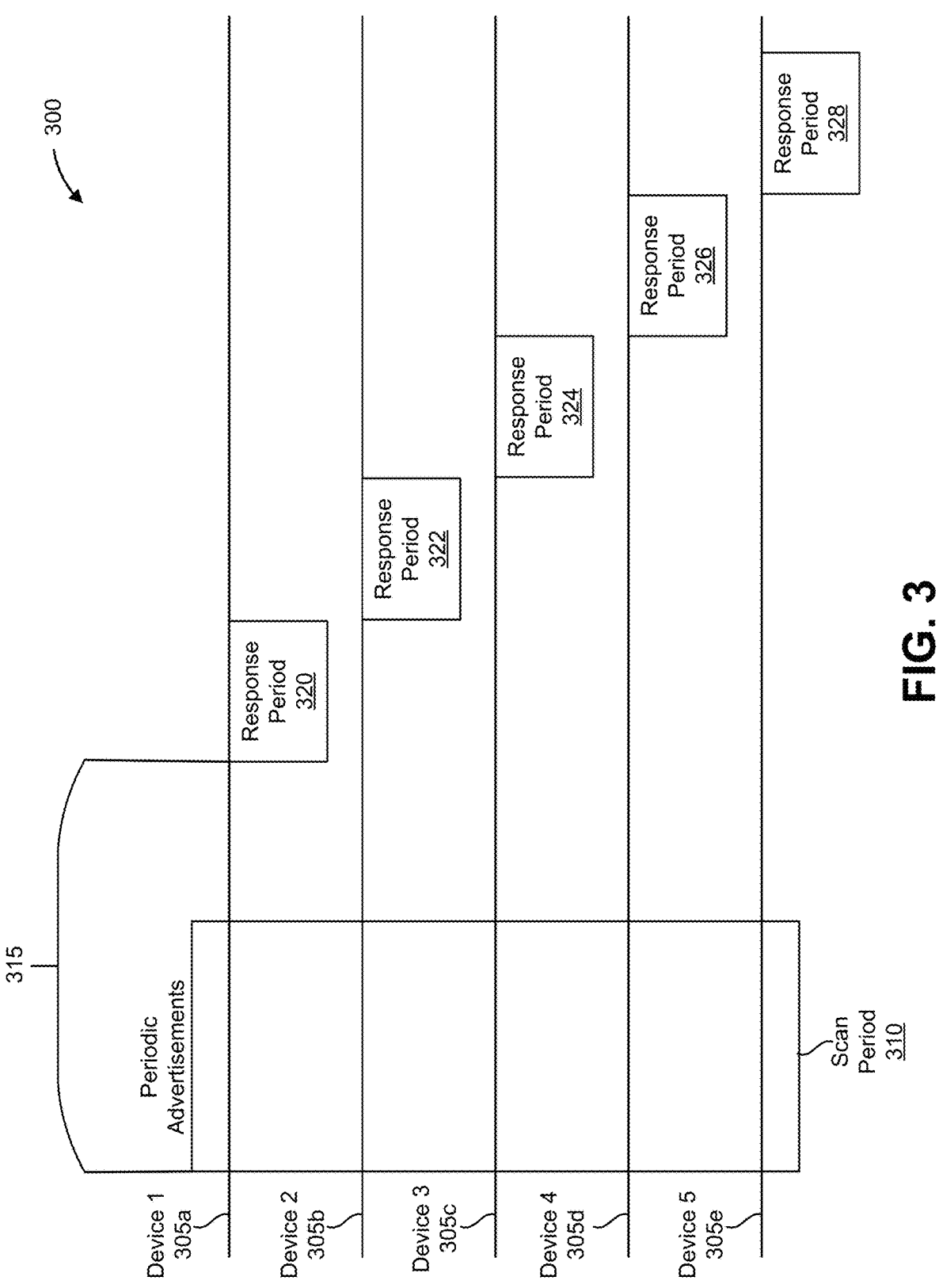
FIG. 3 is a signaling diagram illustrating example communication transmissions, in accordance with some aspects of the present disclosure.
Figure 4:
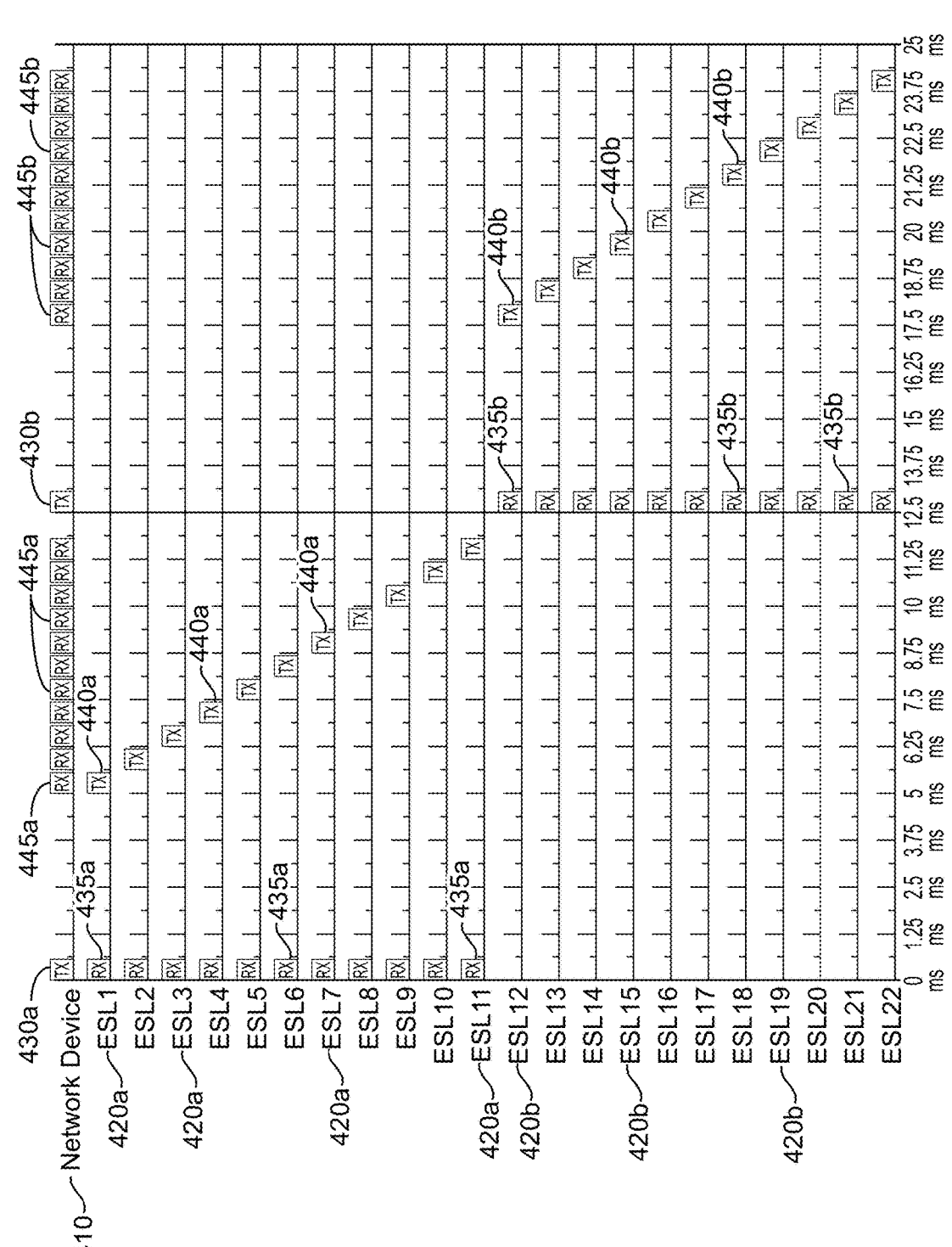
FIG. 4 is a signaling diagram illustrating an example of communication transmissions between a network device and two groups of wireless communication devices, in accordance with some aspects of the present disclosure.

FIGS. 3 and 4 show signaling diagrams 300 and 400, respectively, illustrating examples of PAwR in an ESL system. In particular, the signaling diagram 300 of FIG. 3 shows an example PAwR for a group of wireless network devices (e.g., device 1 305a, device 2 305b, device 3 305c, device 4 305d, and device 5 305e), and the signaling diagram 400 of FIG. 4 shows an example PAR for two groups of wireless network devices 420a, 420b (e.g., a first group including ESL1 to ESL 11, and a second group including ESL 12 to ESL 22). Specifically, FIG. 3 is a signal timing diagram illustrating a portion of a communication between an access point (e.g., access point 110) and wireless communication devices 120 (e.g., ESLs). With reference to FIG. 1, the signal sequence illustrated in FIG. 3 may be implemented by one or more of the communication connections, access points 110, and/or wireless communication devices 120 of FIG. 1.

The devices (e.g., device 1 305a, device 2 305b, device 3 305c, device 4 305d, and device 5 305e) of FIG. 3 may be selected from wireless communication devices 120 of FIG. 1, and may each receive a periodic advertisement with response (PAwR) in a scan period 310. The scan period 310 may occur in regularly scheduled intervals and may be repeated periodically such that the devices (e.g., device 1 305a, device 2 305b, device 3 305c, device 4 305d, and device 5 305e) can awaken to scan for messages during this repeated scan period 310. An access point (e.g., access point 110 of FIG. 1) may provide periodic advertisements (PAS) via broadcast or multi-cast to the devices (e.g., device 1 305a, device 2 305b, device 3 305c, device 4 305d, and device 5 305e) in the scan period 310. For an access point (e.g., access point 110 of FIG. 1), the scan period 310 can be its primary transmission period. In some cases, the scan period 310 may not be a fixed time because the access point (e.g., access point 110 of FIG. 1) may send different lengths of data from the start of the scan period 310.

The transmission may include multiple advertisements in a train. One or more portions of the advertisements may be directed to one or more of the devices (e.g., device 1 305a, device 2 305b, device 3 305c, device 4 305d, and device 5 305e). The devices (e.g., device 1 305a, device 2 305b, device 3 305c, device 4 305d, and device 5 305e) may decode or filter the messages intended for each specific device and transmitted during the period when all devices are receiving. In this way, the devices (e.g., device 1 305a, device 2 305b, device 3 305c, device 4 305d, and device 5 305e) may be reprogrammed, updated, and/or sent requests from an access point (e.g., access point 110 of FIG. 1) or relayed from another device (e.g., management entity 130 of FIG. 1) through the access point (e.g., access point 110 of FIG. 1). The periodic advertisement (PA) from the access point (e.g., access point 110 of FIG. 1) may set a response period for one or more of the devices (e.g., device 1 305a, device 2 305b, device 3 305c, device 4 305d, and device 5 305e).

As illustrated, the devices (e.g., device 1 305a, device 2 305b, device 3 305c, device 4 305d, and device 5 305e) are each assigned a response period 320, 322, 324, 326, 328 in the time after the scan period 310. In some cases, the assignment of the response period to a particular device may not be permanent. In some aspects, the assignment may be inferred from a payload of a synchronization message. The first response period 320 may begin following an idle time 315 after the scan period 310, with the idle period being long enough to provide the transmitter device an opportunity to do other Bluetooth related activities. The assigned response periods may also be limited to or designate a particular frequency of the channels on which to respond. For example, in FIG. 3, device 1 305a is assigned response period 320, device 2 305b is assigned response period 322, device 3 305c is assigned response period 324, device 4 305d is assigned response period 326, and device 5 305e is assigned response period 328. The access point (e.g., access point 110 of FIG. 1) may store attributes of the devices (e.g., device 1 305a, device 2 305b, device 3 305c, device 4 305d, and device 5 305c), including whether a device is able to transmit or respond. The PA signaling followed by responses can be referred to as periodic advertisement with response (PAwR), as described herein.

For example, device 3 305c (e.g., wireless communication device 120 of FIG. 1) may be an ESL and may receive a price update in a PA from the access point (e.g., access point 110 of FIG. 1) in scan period 310. The PA received at device 3 305c may include a designated start time for the response period 324 or may include a schedule of response start times for devices including device 3 305c. The response by device 3 305c to the access point (e.g., access point 110 of FIG. 1) may include an acknowledgement, a status code, and/or other information such as battery life, received signal strength, and/or an error notification. The response by device 3 305c may include information to be relayed to another device by the access point (e.g., access point 110 of FIG. 1). The response may include a packet with a header and may conform to any of the Bluetooth protocols. A response may be transmitted in a data channel of the Bluetooth protocol to the access point (e.g., access point 110 of FIG. 1). Both the PA and the responses from all of the devices (e.g., device 1 305a, device 2 305b, device 3 305c, device 4 305d, and device 5 305e) may use channels of the Bluetooth protocol.

A device (e.g., device 5 305e) that has been assigned a response period may not respond and may determine that it has nothing to signal. In other words, the devices (e.g., device 1 305a, device 2 305b, device 3 305c, device 4 305d, and device 5 305c) may determine what response, if any, is required and may or may not respond to a request sent from the access point (e.g., access point 110 of FIG. 1). The response periods 320, 322, 324, 326, 328 may be assigned based on a request for such a period in an open transmission time, the request being sent to the access point (e.g., access point 110 of FIG. 1). The response periods 320, 322, 324, 326, 328 may be assigned based on which devices have been requested by the access point (e.g., access point 110 of FIG. 1) to send data or acknowledgements. The PA messages and responses may be frequency-hopped, time synchronized channels, and/or extended channels of the advertising channels in Bluetooth.

As previously mentioned, FIG. 4 shows an example PAR for two groups of wireless network devices 420a, 420b (e.g., a first group including ESL1 to ESL 11, and a second group including ESL 12 to ESL 22). In particular, FIG. 4 is a signaling diagram illustrating an example of communication transmissions 400 between a network device 410 (e.g., a central device, which may be an access point) and two groups of wireless communication devices 420a, 420b (e.g., peripheral devices, which may be ESLs). With reference to FIG. 1, the signal sequence illustrated in FIG. 4 may be implemented by one or more of the communication connections, access points 110, and/or wireless communication devices 120 of FIG. 1.

In FIG. 4, the signaling diagram is shown in the form of a graph with an x-axis denoting time in milliseconds (ms) and a y-axis denoting specific wireless communication devices 420a, 420b (e.g., ESL1, ESL 2, ESL 3, ESL 4, ESL 5, ESL 6, ESL 7, ESL 8, ESL 9, ESL 10, ESL 11, ESL 12, ESL 13, ESL 14, ESL 15, ESL 16, ESL 17, ESL 18, ESL 19, ESL 20, ESL 21, and ESL 22). In particular, the x-axis of the graph of FIG. 4 denotes time starting from 0 ms and ending at 25 ms. The time can be divided into two subframes, which are each a length of 12.5 ms. As such, the two subframes may include a first subframe from 0 ms to 12.5 ms, and a second subframe from 12.5 ms to 25 ms. In one or more examples, there may be more or less than two subframes as is shown in FIG. 4, and/or each subframe may be longer or shorter than 12.5 ms as shown in FIG. 4.

In one or more examples, the wireless communication devices 420a, 420b (e.g., peripheral devices) may be assigned (e.g., by the network device 410 and/or by a network entity, such as a management entity) to different groups (e.g., two groups) of wireless communication devices 420a, 420b. For example, wireless communication devices 420a (e.g., ESL1, ESL 2, ESL 3, ESL 4, ESL 5, ESL 6, ESL 7, ESL 8, ESL 9, ESL 10, and ESL 11) may be assigned to a first group (e.g., group 1), and wireless communication devices 420b (e.g., ESL 12, ESL 13, ESL 14, ESL 15, ESL 16, ESL 17, ESL 18, ESL 19, ESL 20, ESL 21, and ESL 22) may be assigned to second group (e.g., group 2).

In FIG. 4, during operation for PAwR, at time 0 ms for the first subframe of time, the network device 410 (e.g., a central, such as an AP) may transmit 430a to a first group (e.g., group 1) of wireless communication devices 420a (e.g., ESL 1, ESL 2, ESL 3. ESL 4, ESL 5, ESL 6, ESL 7, ESL 8, ESL 9, ESL 10, and ESL 11) a PA containing a synchronization message (e.g., an AP synchronization message) over a synchronized channel between the network device 410 and the wireless communication devices 420a, 420b. As noted previously, a synchronization message can include one or more commands. For instance, a command can include an operational code (OpCode) and parameters associated with the command. At time 0 ms, the first group of wireless communication devices 420a (e.g., ESL 1, ESL 2, ESL 3, ESL 4, ESL 5, ESL 6, ESL 7, ESL 8, ESL 9, ESL 10, and ESL 11) can receive 435a the PA containing the synchronization message over the synchronized channel.

In one or more examples, the network device 410 may be configured to transmit PAs at a specified time interval (e.g., a subframe of time), such as at every 12.5 ms as is shown in FIG. 4. In one or more examples, the specified time interval (e.g., a subframe) may be shorter or longer than the 12.5 ms as is shown in FIG. 4. The wireless communication devices 420a, 420b may respond to a PA by using their specific respective response slot in time.

In one or more examples, the synchronization message transmitted 430a to the first group (e.g., group 1) of wireless communication devices 420a (e.g., ESL 1, ESL 2, ESL 3, ESL 4, ESL 5, ESL 6, ESL 7, ESL 8, ESL 9, ESL 10, and ESL 11) may indicate a respective response slot for one or more of the wireless communication devices 420a (e.g., ESL 1, ESL 2, ESL 3, ESL 4, ESL 5, ESL 6, ESL 7, ESL 8, ESL 9, ESL 10, and/or ESL 11) in the first group to use to transmit 440a a response to the network device 410. If a wireless communication device 420a (e.g., ESL 1, ESL 2, ESL 3, ESL 4, ESL 5, ESL 6. ESL 7, ESL 8, ESL 9, ESL 10, and ESL 11) is addressed within the synchronization message, the wireless communication device 420a (e.g., ESL 1, ESL 2, ESL 3, ESL 4, ESL 5, ESL 6, ESL 7, ESL 8, ESL 9, ESL 10, and ESL 11) can respond (e.g., transmit 440a) in its respective response slot, as indicated within the synchronization message.

For example, the synchronization message may indicate a specific sequence for one or more of the wireless communication devices 420a (e.g., ESL 1, ESL 2, ESL 3, ESL 4, ESL 5, ESL 6, ESL 7, ESL 8, ESL 9, ESL 10, and/or ESL 11) to respond (e.g., transmit 440a) in time (e.g., responding after 5 ms has elapsed after the start of the subframe at response slots located every 0.625 ms). For example, the sequence may indicate that wireless communication device 420a (e.g., ESL 1) should respond in a response slot located at 5 ms, wireless communication device 420a (e.g., ESL 2) should respond in a response slot located at 5.625 ms, wireless communication device 420a (e.g., ESL 3) should respond in a response slot located at 6.25 ms, wireless communication device 420a (e.g., ESL 4) should respond in a response slot located at 6.875 ms, wireless communication device 420a (e.g., ESL 5) should respond in a response slot located at 7.5 ms, wireless communication device 420a (e.g., ESL 6) should respond in a response slot located at 8.125 ms, wireless communication device 420a (e.g., ESL 7) should respond in a response slot located at 8.75 ms, wireless communication device 420a (e.g., ESL 8) should respond in a response slot located at 9.375 ms, wireless communication device 420a (e.g., ESL 9) should respond in a response slot located at 10 ms, wireless communication device 420a (e.g., ESL 10) should respond in a response slot located at 10.625 ms, and wireless communication device 420a (e.g., ESL 11) should respond in a response slot located at 11.25 ms.

After the wireless communication devices 420a (e.g., ESL 1, ESL 2, ESL 3, ESL 4. ESL 5, ESL 6, ESL 7, ESL 8, ESL 9, ESL 10, and ESL 11) have received 435a the PA containing the synchronization message from the network device 410, according to the sequence specified within the synchronization message, the one or more wireless communication devices 420a (e.g., ESL 1, ESL 2, ESL 3, ESL 4, ESL 5, ESL 6, ESL 7, ESL 8. ESL 9, ESL 10, and/or ESL 11) can transmit 440a their responses within their respective response slots. After the one or more wireless communication devices 420a (e.g., ESL 1, ESL 2, ESL 3, ESL 4, ESL 5, ESL 6, ESL 7, ESL 8, ESL 9, ESL 10, and/or ESL 11) have transmitted 440a their responses in their respective response time slots, the network device 410 can receive 445a their transmitted responses at those specific response slot times.

During operation for PAwR, at time 12.5 ms for the second subframe of time, the network device 410 may transmit 430b to a second group (e.g., group 2) of wireless communication devices 420b (e.g., ESL 12, ESL 13, ESL 14, ESL 15, ESL 16, ESL 17, ESL 18, ESL 19, ESL 20, ESL 21, and ESL 22) a PA containing a synchronization message over a synchronized channel between the network device 410 and the wireless communication devices 420a, 420b. In addition, at time 12.5 ms, the second group of wireless communication devices 420b (e.g., ESL 12, ESL 13, ESL 14, ESL 15, ESL 16, ESL 17, ESL 18, ESL 19, ESL 20, ESL 21, and ESL 22) can receive 435b the PA containing the synchronization message over the synchronized channel.

The synchronization message transmitted 430b to the second group (e.g., group 2) of wireless communication devices 420b (e.g., ESL 12, ESL 13, ESL 14, ESL 15, ESL 16. ESL 17, ESL 18, ESL 19, ESL 20, ESL 21, and ESL 22) may indicate a respective response slot for one or more of the wireless communication devices 420b (e.g., ESL 12, ESL 13, ESL 14, ESL 15, ESL 16, ESL 17, ESL 18, ESL 19, ESL 20, ESL 21, and/or ESL 22) in the second group to use to transmit 440b a response to the network device 410. If a wireless communication device 420b (e.g., ESL 12, ESL 13, ESL 14, ESL 15, ESL 16, ESL 17, ESL 18, ESL 19, ESL 20, ESL 21, and ESL 22) is addressed within the synchronization message, the wireless communication device 420b (e.g., ESL 12, ESL 13, ESL 14, ESL 15, ESL 16, ESL 17, ESL 18, ESL 19, ESL 20, ESL 21, and ESL 22) can respond (e.g., transmit 440b) in its respective response slot, as indicated within the synchronization message.

For example, the synchronization message may indicate a specific sequence for one or more of the wireless communication devices 420b (e.g., ESL 12, ESL 13, ESL 14, ESL 15, ESL 16, ESL 17, ESL 18, ESL 19, ESL 20, ESL 21, and/or ESL 22) to respond (e.g., transmit 440b) in time (e.g., responding after 5 ms has elapsed after the start of the subframe at response slots located every 0.625 ms). For example, the sequence may indicate that wireless communication device 420b (e.g., ESL 12) should respond in a response slot located at 17.5 ms, wireless communication device 420b (e.g., ESL 13) should respond in a response slot located at 18.125 ms, wireless communication device 420b (e.g., ESL 14) should respond in a response slot located at 18.75 ms, wireless communication device 420b (e.g., ESL 15) should respond in a response slot located at 19.375 ms, wireless communication device 420b (e.g., ESL 16) should respond in a response slot located at 20 ms, wireless communication device 420b (e.g., ESL 17) should respond in a response slot located at 20.625 ms, wireless communication device 420b (e.g., ESL 18) should respond in a response slot located at 21.25 ms, wireless communication device 420b (e.g., ESL 19) should respond in a response slot located at 21.875 ms, wireless communication device 420b (e.g., ESL 20) should respond in a response slot located at 22.5 ms, wireless communication device 420b (e.g., ESL 21) should respond in a response slot located at 23.125 ms, and wireless communication device 420b (e.g., ESL 22) should respond in a response slot located at 23.75 ms.

After the wireless communication devices 420b (e.g., ESL 12, ESL 13, ESL 14, ESL 15, ESL 16, ESL 17, ESL 18, ESL 19, ESL 20, ESL 21, and ESL 22) have received 435*b* the PA containing the synchronization message from the network device 410, according to the sequence specified within the synchronization message, the one or more wireless communication devices 420*b* (e.g., ESL 12, ESL 13, ESL 14, ESL 15, ESL 16, ESL 17. ESL 18, ESL 19, ESL 20, ESL 21, and/or ESL 22) may transmit 440*b* their responses within their respective response slots. After the one or more wireless communication devices 420*b* (e.g., ESL 12, ESL 13, ESL 14, ESL 15, ESL 16, ESL 17, ESL 18, ESL 19, ESL 20, ESL 21, and/or ESL 22) have transmitted 440*b* their responses in their respective response time slots, the network device 410 can receive 445*b* their transmitted responses at those specific response slot times. The PAwR may continue similarly for subsequent subframes of time.

As previously mentioned, for an ESL system, in the PAwR specification, a wireless communication device (e.g., an ESL) may transmit a response (e.g., a response message including a AUX_SYNC_SUBEVENT_RSP packet) when instructed (e.g., requested) by its host (e.g., an ME). The host (e.g., the ME) determines the response slot (e.g., time slot) for the wireless communication device (e.g., the ESL) to send (e.g., transmit) the response. The host (e.g., the ME) determines whether or not the wireless communication device sends a response, and at which response slot the wireless communication device sends the response. As such, in an ESL system, it is typically the host (e.g., the ME) that decides how and when the wireless communication devices (e.g., ESLs) send their responses.

In some cases, a wireless communication device (e.g., ESL) may want to send its associated data (e.g., sensor data, such as its battery level) to its associated network device (e.g., an access point with which the wireless communication device is synchronized). However, currently, in an ESL system, there is no notification mechanism for a wireless communication device (e.g., an ESL) to be able to unilaterally send (e.g., unilaterally transmit) data (e.g., sensor data, such as a battery level) within a response. The terms "unilaterally send" and "unilaterally transmit" both refer to the wireless communication device sending (or transmitting) an unsolicited response, which is a response that is sent without the wireless communication device previously receiving a request from a network device (e.g., access point) for the response. As such, a wireless communication device (e.g., ESL) cannot send a response (e.g., including data) without being previously requested by a network device (e.g., access point) for the response.

Currently, if a wireless communication device (e.g., an ESL) wants to send a response (e.g., including data) to a network device (e.g., an access point) on a PAwR train unsolicited, the wireless communication device will not know when the network device can receive the response, and will not know when and how to send the response to the network device. As such, a procedure that allows for a wireless communication device (e.g., an ESL) to send (e.g., transmit) a response (e.g., including data) to a network device (e.g., an access point) on a PAwR train without previously receiving a request for the response from the network device can be useful.

In one or more aspects, the systems and techniques provide solutions for providing a notification of available slots (e.g., response slots) within a wireless communication device system (e.g., an ESL system). In one or more examples, the systems and techniques allow for a wireless communication device (e.g., an ESL) to send a response (e.g., including data) to a network device (e.g., an access point) at a specific response slot that is specified by the network device. In some examples, a controller within the network device can determine the specific response slot according to a task schedule of the controller such that the response received from the wireless communication device does not conflict with any other scheduled tasks (e.g., other scheduled receptions of signals).

In one or more aspects, a controller of a network device (e.g., an access point) can determine, according to a task schedule of the controller, a plurality of response slots over a time duration for a plurality of wireless communication devices (e.g., ESLs within a group of ESLs) to unilaterally transmit data to the network device. In one or more examples, the network device can send (e.g., transmit) a PAwR message including an AUX_SYNC_SUBEVENT_IND PDU packet to the plurality of wireless communication devices. In some examples, the AUX_SYNC_SUBEVENT_IND PDU packet can include a bitmap indicating the available response slots.

In one or more examples, the plurality of wireless communication devices (e.g., ESLs within a group of ESLs) can receive the PAR message indicating the available response slots. In some examples, the plurality of wireless communication devices can each decode the bitmap within the PAwR message to determine the available response slots. In one or more examples, when a wireless communication device of the plurality of wireless communication devices wants to send its data (e.g., sensor data, such as a battery level) to the network device, the wireless communication device can unilaterally send (e.g., transmit) at one of the available response slots, to the network device, a response (e.g., a response message including an AUX_SYNC_SUBEVENT_RSP packet) including the data.

As previously mentioned, in some cases, a network device (e.g., an access point) may need to send (e.g., transmit) a large data package to one or more wireless communication devices (e.g., ESLs). The data package can contain any type of data, such as a firmware update (FWUP), which may consist of a firmware update image. Generally, a network device (e.g., an access point) will send (e.g., transmit) a large data package to a wireless communication device (e.g., an ESL) via a direct connection with the wireless communication device (e.g., referred to as a direct connection data transfer method) because of the large size of the data package. In a wireless communication device network (e.g., an ESL network) including hundreds or thousands of wireless communication devices (e.g., ESLs), this direct connection data transfer method of transferring large data packages can require a large amount of time because the network device (e.g., an access point) is only capable of supporting a certain number of parallel connections (e.g., one-to-one connections, each connection being between the network device and one of the wireless communication devices) at a time. Thus, this direct connection data transfer method for transferring data is limited by the number of parallel connections that a network device (e.g., an access point) can support and is not easily scalable.

As illustrated in FIG. 4, the existing AP synchronization broadcast (e.g., PA containing a synchronization message) is subframe specific, meaning that a particular wireless communication device (e.g., ESL) can only receive a message transmitted within a subframe that the wireless communication device is subscribed. For example, when referring to FIG. 4, ESL 1 420*a* can receive messages (e.g., an AP synchronization message) only transmitted within the first subframe from 0 ms to 12.5 ms, and ESL 12 420*b* can receive messages only transmitted within the second subframe from 12.5 ms to 25 ms. As such, under this existing method, if a network device (e.g., an access point) uses broadcasting as a mechanism to transfer large data packages (e.g., divided into segments) to a plurality of wireless communication devices (e.g., ESLs), the network device (e.g., access point) will need to manage the segments transmitted per subframe, which will not be very time efficient. As such, an improved procedure that allows for a fast data transfer of a large data package (e.g., a firmware update) from a network device (e.g., an access point) to a plurality of wireless communication devices (e.g., ESLs) can be useful.

In one or more aspects, the systems and techniques provide for data transfer in wireless communication device networks (e.g., ESL networks). The systems and techniques can allow for a network device (e.g., an access point) to divide a large data package (e.g., including a firmware update) into a plurality of segments, and to send (e.g., transmit) the segments to wireless communication devices (e.g., ESLs) via a broadcast.

The systems and techniques employ a pan subframe broadcast mechanism to allow network devices (e.g., access points) to perform faster transfers of large data packages to wireless communication devices (e.g., ESLs). The pan subframe broadcast mechanism can allow wireless communication devices (e.g., ESLs) to switch from an existing subframe specific broadcast mode (e.g., where the wireless communication devices can only receive messages transmitted within their subscribed subframe, as illustrated in FIG. 4) to a pan subframe broadcast mode (e.g., were the wireless communication devices are able to receive messages transmitted within all subframes, including the subframes that they are subscribed).

As previously mentioned, PAwR allows for wireless communication devices (e.g., ESLs) to synchronize with a network device (e.g., an access point), and for the wireless communication devices to be able to respond to the periodic transmissions (PA) sent from the network device. A network device (e.g., access point) can broadcast messages, which are typically subframe bound (e.g., as shown in FIG. 4). These broadcast messages transmitted by the network device can only be received by wireless communication devices (e.g., ESLs) that are subscribed on that particular subframe (e.g., when the wireless communication devices are operating a normal mode, which is a subframe specific broadcast mode).

When wireless communication devices (e.g., ESLs) are synchronized to the network (e.g., access point), the wireless communication devices have access to the channel map being used by the network device (e.g., access point) as well as to associated diversifiers (e.g., which may include an event counter and subframe number for the current subframe). The network device (e.g., access point) may select the channel (e.g., frequency channel, such as an aux channel) to be used for a particular subframe based on the channel map and the diversifiers. Since the wireless communication devices (e.g., ESLs) have access to the channel map being used by the network device (e.g., access point) and the diversifiers, the wireless communication devices (e.g., ESLs) may use this information to determine the Tx channels being used by the network device (e.g., access point) for all of the subframes (e.g., including the subframes that the wireless communication devices are not subscribed on). The wireless communication devices (e.g., when switched to operate in the pan subframe broadcast mode) may tune to those Tx channels during those subframes to receive messages (e.g., which may include segments of large data packages) on all of the subframes transmitted by the network device.

The systems and techniques leverage the pan subframe broadcast mechanism (along with built-in retransmissions to correct for any missed data packets during the data transfer) to allow for a fast data transfer of large data packages from a network device (e.g., an access point) to a plurality of wireless communication devices (e.g., ESLs). This pan subframe broadcast mechanism can be used for the transfer of any type of large data packages, which may include firmware updates or any other bulk-data transfer activity destined for the wireless communication devices (e.g., ESLs). When the wireless communication devices (e.g., ESLs) are operating in the pan subframe broadcast mode, the wireless communication devices (e.g., ESLs) can receive transmissions from the network device (e.g., access point) on all subframes.

In one or more aspects, the wireless communication devices (e.g., ESLs) can operate in the pan subframe broadcast mode for a limited duration of time. When the wireless communication devices (e.g., ESLs) are operating in the pan subframe broadcast mode, the wireless communication devices (e.g., ESLs) will not follow their specific wake-up schedule to scan for messages only on their subscribed subframe and, instead, will follow the full PAWR rate and scan for messages on all subframes. During the time that the wireless communication devices (e.g., ESLs) are operating in the pan subframe broadcast mode, the wireless communication devices (e.g., ESLs) can accumulate all of the segments containing data for a data transfer at a much higher rate as compared to when wireless communication devices (e.g., ESLs) operate in the normal operating mode (the subframe specific broadcast mode).

In one or more aspects, the wireless communication devices (e.g., ESLs) may subsequently (e.g., after the wireless communication devices have received the full data package from the network device) receive a message (e.g., a broadcast command) from the network device (e.g., an access point) indicating that the wireless communication devices (e.g., ESLs) should apply the received data package (e.g., apply the firmware update) once the full data package has been received or apply the received data package at a specific time (e.g., to coordinate a start time of the update after the transfer of the data package).

Figure 5:
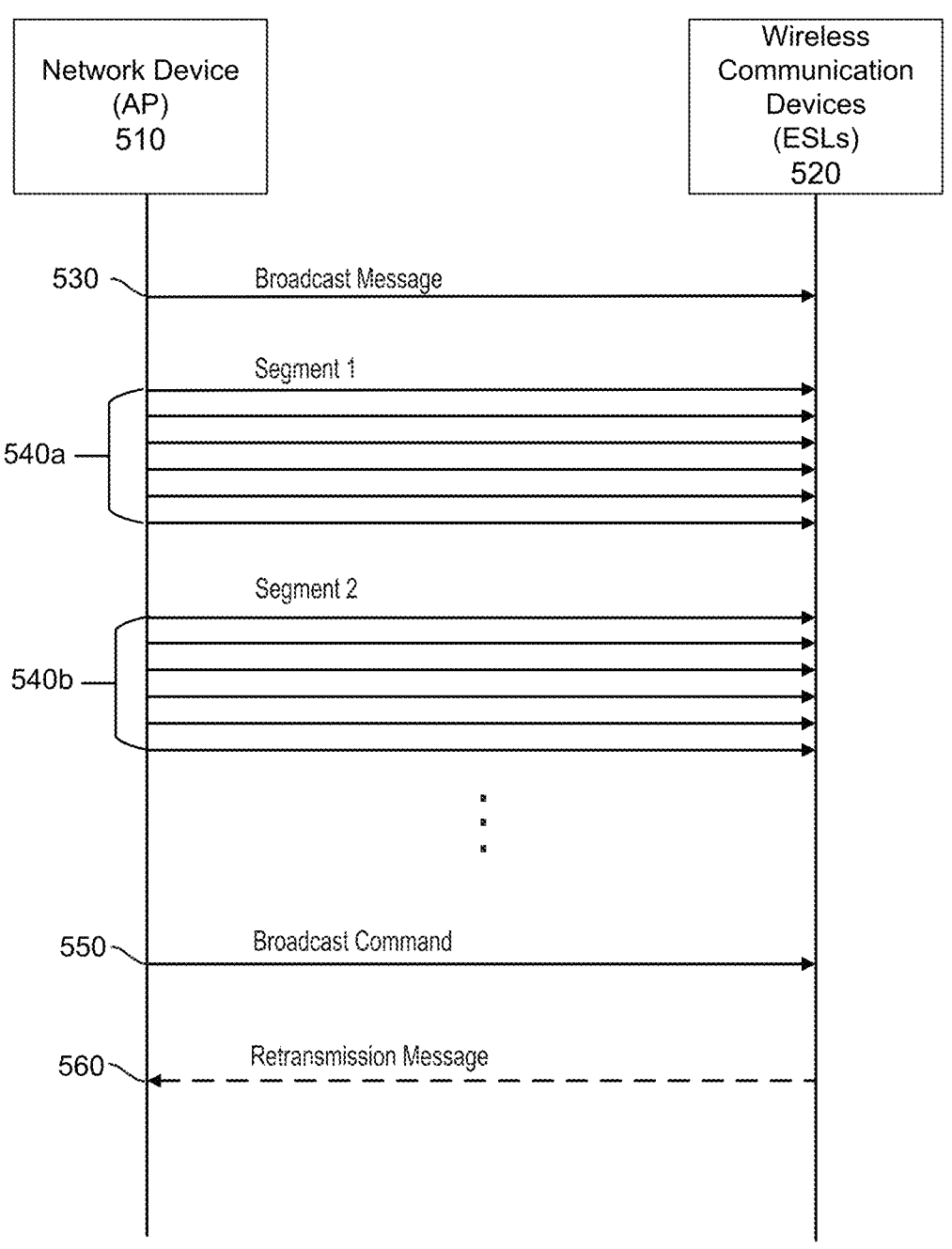
FIG. 5 is a signaling diagram illustrating an example of communication transmissions between a network device and a group of wireless communication devices for providing a data transfer, in accordance with some aspects of the present disclosure.

In one or more aspects, the systems and techniques provide a signaling procedure for data transfer in wireless communication device networks (e.g., ESL networks), which is scalable and independent of a count of subscribed wireless communication devices (e.g., peripherals, such as ESLs). FIG. 5 show an example of signaling that may be employed for a fast data transfer in a wireless communication device network. In particular, FIG. 5 is a signaling diagram 500 illustrating an example of communication transmissions between a network device 510 and a group of wireless communication devices 520 for providing data transfer. In FIG. 5, the network device 510 may be in the form of an access point, such as access point 110 of FIG. 1 and/or network device 410 (which can be an access point in some cases) of FIG. 4. The wireless communication devices 520 in FIG. 5 may each be in the form of an electronic shelf label, such as wireless communication devices 120 of FIG. 1, devices 305a to 305e of FIG. 3, ESLs 1 to 11 420a of FIG. 4, and/or ESLs 12 to 22 420b of FIG. 4. In one or more examples, there may be more or less number of network devices 510, wireless communication devices, and/or other network devices, than as shown in FIG. 5.

During operation for a fast data transfer of a large data package, which uses a pan subframe broadcast mechanism, the network device 510 (e.g., access point) May divide a data package (e.g., a firmware update, which may include a firmware update image) into a plurality of segments. Each of the segments may include one or more data packets. In one or more examples, the network device 510 (e.g., access point) can assign an identification (ID) number to each of the segments (e.g., segment 1, segment 2, segment 3, etc.).

After the network device 510 divides the data package into a plurality of segments, the network device 510 can send (e.g., transmit), to the wireless communication device 520 (e.g., which are operating in a normal mode, which is a subframe specific broadcast mode), a broadcast message 530 (e.g., which may be a subframe specific broadcast message) including information.

In one or more examples, the information in the broadcast message 530 may include an indication of a first time (e.g., a first instant) for the wireless communication devices 520 (e.g., ESLs) to switch from operating in the subframe specific broadcast mode to the pan subframe broadcast mode to be able to receive transmissions on all subframes, and for the wireless communication devices 520 (e.g., ESLs) to start to receive a plurality of subframes including the plurality of segments. The first time (e.g., the first instant) may be associated with a subframe number (e.g., subframe ID) corresponding to a specific subframe at a future time. In some examples, the information may further include a total number of the plurality of segments and/or a total number of the plurality of subframes for the full data package. The wireless communication devices 520 can use the total number of the subframes for the full data package to determine how long to operate in the pan subframe broadcast mode (e.g., to determine when to switch from the pan subframe broadcast mode back to the subframe specific broadcast mode).

At the first time (e.g., the first instant), the wireless communication devices 520 can switch from the subframe specific broadcast mode to the pan subframe broadcast mode to be able to receive (e.g., to scan for) transmissions on all subframes. Further, at the time of the first instant, the network device 510 can start to send (e.g., transmit), to the wireless communication devices 520, the plurality of subframes including the plurality of segments. In one or more examples, each subframe includes one segment, and each segment is transmitted repeatedly for a particular number of consecutive subframes. In some examples, there may be one or more idle subframes between each of the segments.

Figure 6:
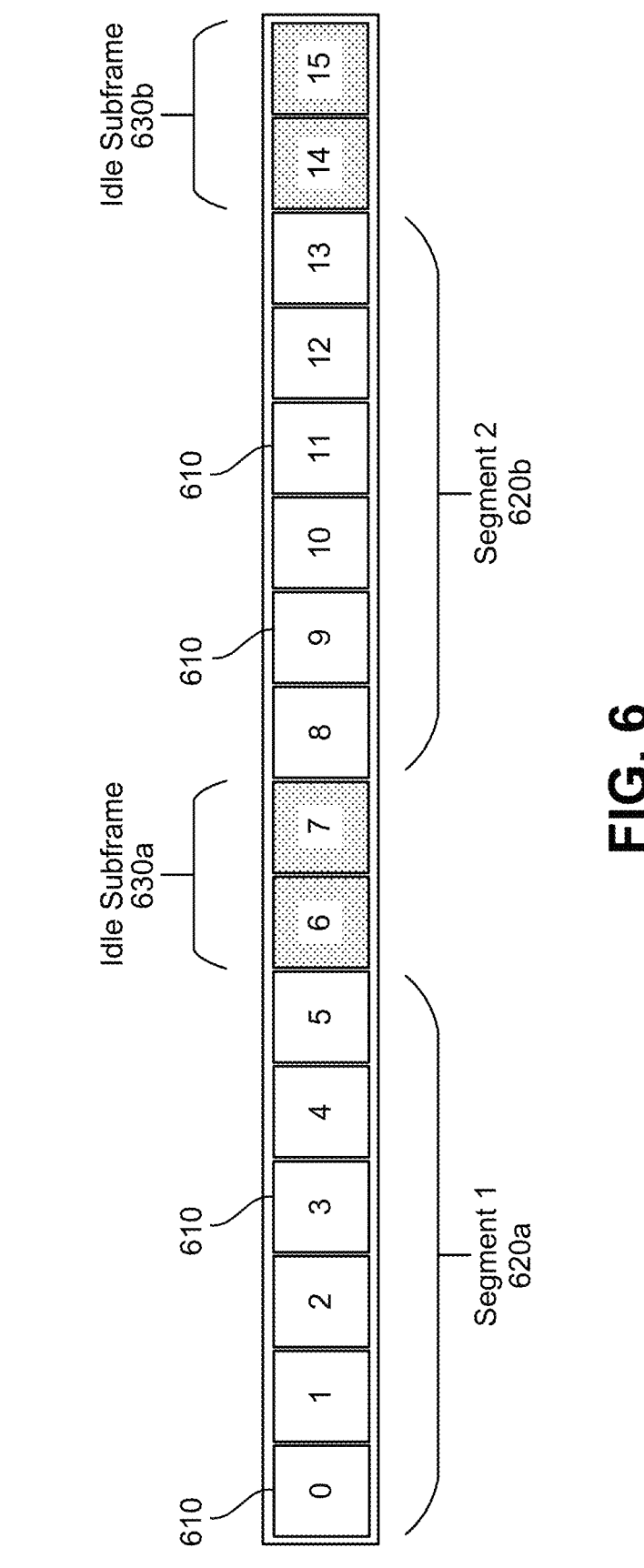
FIG. 6 is a diagram illustrating an example of a subframe structure for transfer of a data package, such as a firmware update, in accordance with some aspects of the present disclosure.

FIG. 6 shows an example of a subframe structure that may be employed for the transmission of the segments of the data package. In particular, FIG. 6 is a diagram illustrating an example of a subframe structure 600 for transfer of a data package, such as a firmware update. The subframe structure 600 is shown to transmit two segments (e.g., segment 1 620a and segment 2 620b) of a data package. In FIG. 6, the subframe structure 600 is shown to include a total of sixteen (16) subframes 610 (e.g., including subframe 0 to subframe 15) that are transmitted over time (e.g., where the x-axis of the subframe structure 600 denotes time). Subframe 0 to subframe 5 each include a copy of segment 1 and, as such, segment 1 is transmitted repeatedly in each subframe from subframe 0 to subframe 5 (e.g., segment 1 is transmitted a total of six times). Subframe 8 to subframe 13 each include a copy of segment 2 and, as such, segment 2 is transmitted repeatedly in each subframe from subframe 8 to subframe 13 (e.g., segment 2 is transmitted a total of six times). The segments are transmitted repeatedly for redundancy and fault tolerance. In the subframe structure 600, there are two idle subframes 630a, 630b between each of the segments 620a, 620b. In one or more examples, no transmissions are performed during these idle subframes 630a, 630b. The idle subframes 630a, 630b allow for processing time at the receiver.

In one or more examples, various different timing schemes may be employed for the subframe structure 600. In one illustrative example, it can be assumed that the ESL configuration has a 1.6 seconds frame duration, the total number of subframes is 128, and the sync protocol data unit (PDU) maximum length is 48 Bytes (however, in some cases the maximum length may be up to 254 Bytes or other number of Bytes). It can be assumed that the network device (e.g., access point) transmission fault tolerance, which is retransmission count, is six (6), and the idle count is two (2), as is shown in FIG. 6 As such, for every segment, eight subframes are utilized for transmitting it, inclusive of retransmission for fault tolerance. In this way, the overall firmware update size is of 150 kilobytes, and the number of segments is 605 (e.g., 150 divided by 254). The number of segments that is transmitted in one frame this way would be 16, because there are 128 groups and there are eight subframes per segment. Hence, for every 1.6 seconds or every frame, 16 such segments may be transmitted. The overall number of frames required for transmitting the full data package would be 38. The time need for the transmission will be around 60.8 seconds. This time does not include the initial part, where the network device (e.g., access point) sends the broadcast message to indicate to the wireless communication device (e.g., ESLs) when to start receiving the segments (e.g., the AP sync), after a particular duration. This time also does not include any time for any failures that are reported from the device. However, considering an ideal scenario where every wireless communication was successful (e.g., successfully received the full data package), this time (e.g., 60.8 seconds) is the core time for receiving the full data package (e.g., firmware update) from the network device (e.g., access point).

Referring back to FIG. 5, at the time of the first time (e.g., the first instant), the network device 510 (e.g., access point) can transmit the segments repeatedly to the wireless communication devices 520 (e.g., ESLs). For example, in FIG. 5, segment 1 is shown to be repeatedly transmitted 540a for a total of six times from the network device 510 to the wireless communication devices 520. FIG. 5 also shows segment 2 being repeatedly transmitted 540b for a total of six times from the network device 510 to the wireless communication devices 520. The network device 510 can continue to transmit the segments repeatedly to the wireless communication devices 520 until all of the segments of the full data package have been transmitted.

At the time of the first time (e.g., the first instant), the wireless communication devices 520 (e.g., ESLs) can start to scan for all of the subframes to receive the segments of the data package. The wireless communication devices 520 (e.g., ESLs) can accumulate the segments, and store the received segments into some form of memory, such as non-volatile memory (NVM).

After the network device 510 has transmitted all of the segments of the full data package to the wireless communication devices 520, the network device 510 can send (e.g., transmit) to the wireless communication devices 520 a broadcast command 550. The broadcast command 550 can indicate a second time (e.g., a second instant) for the wireless communication devices 520 to apply the received data package. For example, if the data package includes a firmware update, the wireless communication devices 520 can apply the firmware update at the second time (e.g., the second instant). Then, at the time of the second time (e.g., the second instant), the wireless communication devices 520 can apply the data package (e.g., apply the firmware update). In some cases, the broadcast command 550 with the second time indicating when to apply the received package may not be needed. For instance, the data packets of the received segments can include an indication of the second time (e.g., the second time can be embedded in the data packets of the received segments).

In one or more examples, if after the transmission of the full data package by the network device 510 (e.g., access point), one or more of the wireless communication devices 520 did not successfully receive the full data package (e.g., missed one or more of the segments of the full data package), the one or more of the wireless communication devices 520 can send (e.g., transmit), to the network device 510, a retransmission message 560. The retransmission message 560 can indicate that the one or more of the wireless communication devices 520 did to receive the total number of segments of the full data package.

In one or more examples, if the number of wireless communication devices 520 that did not receive the full data package is less than a predetermined threshold value (e.g., five wireless communication devices, ten wireless communication devices, twenty wireless communication devices, fifty wireless communication devices, or other threshold value), the network device 510 can create a direct connection with the wireless communication devices 520 that did not receive the full data package, and can directly transmit the subframes including the segments of the data package to the wireless communication devices 520 that did not receive the full data package. However, if the number of wireless communication devices 520 that did not receive the full data package is greater than or equal to the predetermined threshold value, the network device 510 can simply retransmit the broadcast message 530 and the subframes including the segments of the data package to the wireless communication devices 520.

FIG. 7 is a flow chart illustrating an example of a process 700 for wireless communications utilizing methods for providing data transfer in peripheral device networks (e.g., ESL networks). The process 700 can be performed by a network device (e.g., access point 110 of FIG. 1, device 200 of FIG. 2, network device 410 or other device of FIG. 4, and/or network device 510 or other device of FIG. 5) or by a component or system (e.g., a chipset) of the network device. The operations of the process 700 may be implemented as software components that are executed and run on one or more processors (e.g., processor 210 of FIG. 2, processor 910 of FIG. 9, and/or other processor(s)). Further, the transmission and reception of signals by the network device in the process 700 may be enabled, for example, by one or more antennas and/or one or more transceivers such as one or more wireless transceivers (e.g., communication component 235 of FIG. 2, communication interface 940 of FIG. 9, and/or other antenna and/or transceiver(s)).

At block 710, the network device (or component thereof) can divide a data package into a plurality of segments (e.g., segment 1 540a, segment 2 540b, or other segment of FIG. 5). In some examples, the data package is a firmware update (FWUP) or other type of data package. Using FIG. 6 as an illustrative example, the network device (or component thereof) can divide a data package into at least segment 1 620a and segment 2 620b. In some aspects, each segment of the plurality of segments is transmitted within one subframe (e.g., each of the subframes 610 of FIG. 6) of the plurality of subframes repeatedly for a particular number of consecutive subframes (e.g., segment 1 620a is transmitted repeatedly within each of subframes 0, 1, 2, 3, 4, and 5 of FIG. 6). In some cases, one or more idle subframes (e.g., two idle subframes 630a of FIG. 6) are located in between transmissions of each segment of the plurality of segments.

At block 720, the network device (or component thereof) can transmit (or output for transmission), to a plurality of wireless communication devices, a broadcast message (e.g., broadcast message 530 of FIG. 5) indicating a first time to start receiving a plurality of subframes including the plurality of segments, a total number of the plurality of segments, and a total number of the plurality of subframes for the data package. In some aspects, the first time is associated with a subframe number corresponding to a specific subframe at a future time. As noted above, in some cases, the network device is an access point (AP). In some examples, each wireless communication device of the plurality of wireless communication devices is an electronic shelf label (ESL).

At block 730, the network device (or component thereof) can transmit (or output for transmission), to the plurality of wireless communication devices starting at the first time, the plurality of subframes including the plurality of segments (e.g., in transmissions 540a of FIG. 5).

In some cases, the network device (or component thereof) can transmit (or output for transmission), to the plurality of wireless communication devices, a broadcast command (e.g., broadcast command 550 of FIG. 5) indicating a second time for the plurality of wireless communication devices to apply the data package. As noted previously, in some cases, data packets of the received segments can include an indication of the second time (e.g., the second time can be embedded in the data packets of the received segments), in which case the broadcast command with the second time may not be needed.

In some aspects, the network device (or component thereof) can receive, from a wireless communication device of the plurality of wireless communication devices, a retransmission message (e.g., retransmission message 560 of FIG. 5) indicating that the wireless communication device did not receive all of the total number of the plurality of segments.

In some examples, the network device (or component thereof) can receive retransmission messages from one or more wireless communication devices of the plurality of wireless communication devices. In some cases, the network device (or component thereof) can transmit (or output for transmission) the plurality of subframes including the plurality of segments directly to each of the one or more wireless communication devices based on a number of the one or more wireless communication devices being less than a threshold value. In some cases, the network device (or component thereof) can retransmit (or output for retransmission), to the plurality of wireless communication devices, the broadcast message and the plurality of subframes including the plurality of segments based on a number of the one or more wireless communication devices being greater than or equal to the threshold value. Referring to FIG. 5 as an illustrative example, if a number of wireless communication devices 520 that did not receive the full data package is less than a predetermined threshold value, the network device 510 can create a direct connection with the wireless communication devices 520 that did not receive the full data package, and can directly transmit the subframes including the segments of the data package to the wireless communication devices 520 that did not receive the full data package. However, if the number of wireless communication devices 520 that did not receive the full data package is greater than or equal to the predetermined threshold value, the network device 510 can simply retransmit the broadcast message 530 and the subframes including the segments of the data package to the wireless communication devices 520.

FIG. 8 is a flow chart illustrating an example of a process 800 for wireless communications utilizing methods for providing data transfer in peripheral device networks (e.g., ESL networks). The process 800 can be performed by a wireless communication device (e.g., wireless communication device 120 of FIG. 1, device 200 of FIG. 2, device 1 305a or other device of FIG. 3, wireless network device 420a or other device of FIG. 4, and/or wireless communication device 520 or other device of FIG. 5) or by a component or system (e.g., a chipset) of the wireless communication device. In some examples, the wireless communication device is a peripheral device, such as an electronic shelf label (ESL). The operations of the process 800 may be implemented as software components that are executed and run on one or more processors (e.g., processor 210 of FIG. 2, processor 910 of FIG. 9, and/or other processor(s)). Further, the transmission and reception of signals by the wireless communications device in the process 800 may be enabled, for example, by one or more antennas and/or one or more transceivers such as one or more wireless transceivers (e.g., communication component 235 of FIG. 2, communication interface 940 of FIG. 9, and/or other antenna and/or transceiver(s)).

At block 810, the wireless communication device (or component thereof, such as at least one transceiver) can receive, from a network device, a broadcast message indicating a first time to start receiving a plurality of subframes including a plurality of segments of a data package, a total number of the plurality of segments, and a total number of the plurality of subframes for the data package. In some aspects, the first time is associated with a subframe number corresponding to a specific subframe at a future time. As noted above, in some cases, the wireless communication device is an ESL. In some examples, the network device is an AP. In some cases, the data package is a firmware update (FWUP) or other type of data package.

At block 820, the wireless communication device (or component thereof, such as at least one transceiver) can switch, at the first time, from a subframe specific broadcast mode for receiving a specific subframe of subframes within a frame, to a pan subframe broadcast mode for receiving all the subframes within the frame.

At block 830, the wireless communication device (or component thereof, such as at least one transceiver) can receive, from the network device starting at the first time, the plurality of subframes including the plurality of segments.

In some aspects, the wireless communication device (or component thereof) can receive, from the network device, a broadcast command (e.g., broadcast command 550 of FIG. 5) indicating a second time for the wireless communication device to apply the data package. In some cases, the wireless communication device (or component thereof) can apply, at the second time, the data package.

In some cases, the wireless communication device (or component thereof) can transmit (or output for transmission), to the network device, a retransmission message (e.g., retransmission message 560 of FIG. 5) indicating that the wireless communication device did not receive all of the total number of the plurality of segments.

In some examples, the network device and/or wireless communication device may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the network device and/or wireless communication device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 700 and the process 800 are each illustrated as a logical flow diagram, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 700, the process 800, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
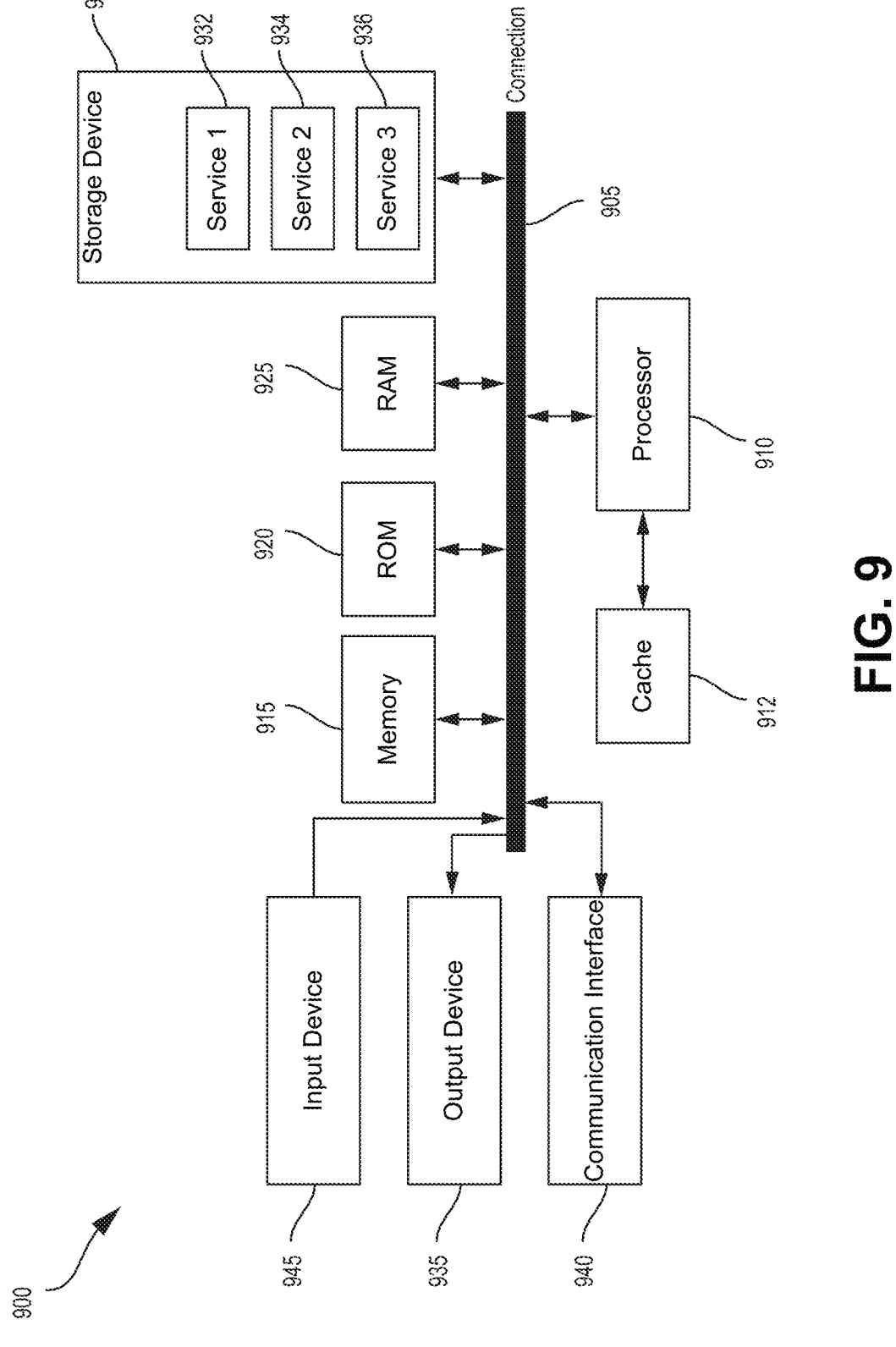
FIG. 9 is a block diagram illustrating an example of a computing system, which may be employed by the disclosed systems and techniques for providing data transfer in peripheral device networks, such as ESL networks, in accordance with some aspects of the present disclosure.

FIG. 9 is a block diagram illustrating an example of a computing system 900, which may be employed by the disclosed systems and techniques for providing data transfer in peripheral device networks (e.g., ESL networks). In particular, FIG. 9 illustrates an example of computing system 900, which can be, for example, any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 900 includes at least one processing unit (CPU or processor) 910 and connection 905 that communicatively couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900.

Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug. 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 940 may also include one or more range sensors (e.g., LIDAR sensors, laser range finders, RF radars, ultrasonic sensors, and infrared (IR) sensors) configured to collect data and provide measurements to processor 910, whereby processor 910 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C. A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A network device for wireless communication, the network device comprising: at least one memory; and at least one processor coupled to the at least one memory and configured to: divide a data package into a plurality of segments; output, for transmission to a plurality of wireless communication devices, a broadcast message indicating a first time to start receiving a plurality of subframes comprising the plurality of segments, a total number of the plurality of segments, and a total number of the plurality of subframes for the data package; and output, for transmission to the plurality of wireless communication devices starting at the first time, the plurality of subframes comprising the plurality of segments.

Aspect 2. The network device of Aspect 1, wherein each segment of the plurality of segments is transmitted within one subframe of the plurality of subframes repeatedly for a particular number of consecutive subframes.

Aspect 3. The network device of Aspect 2, wherein one or more idle subframes are located in between transmissions of each segment of the plurality of segments.

Aspect 4. The network device of any one of Aspects 1 to 3, wherein the at least one processor is configured to output, for transmission to the plurality of wireless communication devices, a broadcast command indicating a second time for the plurality of wireless communication devices to apply the data package.

Aspect 5. The network device of any one of Aspects 1 to 4, wherein the at least one processor is configured to receive, from a wireless communication device of the plurality of wireless communication devices, a retransmission message indicating that the wireless communication device did not receive all of the total number of the plurality of segments.

Aspect 6. The network device of Aspect 5, wherein the at least one processor is configured to: receive retransmission messages from at least one wireless communication device of the plurality of wireless communication devices; and output the plurality of subframes comprising the plurality of segments directly for retransmission to each of the at least one wireless communication device, based on a number of the at least one wireless communication device being less than a threshold value.

Aspect 7. The network device of Aspect 5, wherein the at least one processor is configured to: receive retransmission messages from at least two wireless communication devices of the plurality of wireless communication devices; and output, for retransmission to the plurality of wireless communication devices, the broadcast message and the plurality of subframes comprising the plurality of segments, based on a number of the at least two wireless communication devices being greater than or equal to a threshold value.

Aspect 8. The network device of any one of Aspects 1 to 7, wherein the data package is a firmware update (FWUP).

Aspect 9. The network device of any one of Aspects 1 to 8, wherein the network device is an access point (AP), and each wireless communication device of the plurality of wireless communication devices is an electronic shelf label (ESL).

Aspect 10. The network device of any one of Aspects 1 to 9, wherein the first time is associated with a subframe number corresponding to a specific subframe at a future time.

Aspect 11. A method of wireless communication performed at a network device, the method comprising: dividing, by the network device, a data package into a plurality of segments; transmitting, by the network device to a plurality of wireless communication devices, a broadcast message indicating a first time to start receiving a plurality of subframes comprising the plurality of segments, a total number of the plurality of segments, and a total number of the plurality of subframes for the data package; and transmitting, by the network device to the plurality of wireless communication devices starting at the first time, the plurality of subframes comprising the plurality of segments.

Aspect 12. The method of Aspect 11, wherein each segment of the plurality of segments is transmitted within one subframe of the plurality of subframes repeatedly for a particular number of consecutive subframes.

Aspect 13. The method of Aspect 12, wherein one or more idle subframes are located in between transmissions of each segment of the plurality of segments.

Aspect 14. The method of any one of Aspects 11 to 13, further comprising transmitting, by the network device to the plurality of wireless communication devices, a broadcast command indicating a second time for the plurality of wireless communication devices to apply the data package.

Aspect 15. The method of any one of Aspects 11 to 14, further comprising receiving, by the network device from a wireless communication device of the plurality of wireless communication devices, a retransmission message indicating that the wireless communication device did not receive all of the total number of the plurality of segments.

Aspect 16. The method of Aspect 15, further comprising: receiving, by the network device, retransmission messages from at least one wireless communication device of the plurality of wireless communication devices; and retransmitting, by the network device, the plurality of subframes comprising the plurality of segments directly to each of the at least one wireless communication device, based on a number of the at least one wireless communication device being less than a threshold value.

Aspect 17. The method of Aspect 15, further comprising: receiving, by the network device, retransmission messages from at least two wireless communication devices of the plurality of wireless communication devices; and retransmitting, by the network device to the plurality of wireless communication devices, the broadcast message and the plurality of subframes comprising the plurality of segments, based on a number of the at least two wireless communication devices being greater than or equal to a threshold value.

Aspect 18. The method of any one of Aspects 11 to 17, wherein the data package is a firmware update (FWUP).

Aspect 19. The method of any one of Aspects 11 to 18, wherein the network device is an access point (AP), and each wireless communication device of the plurality of wireless communication devices is an electronic shelf label (ESL).

Aspect 20. The method of any one of Aspects 11 to 19, wherein the first time is associated with a subframe number corresponding to a specific subframe at a future time.

Aspect 21. A wireless communication device for wireless communication, the wireless communication device comprising: at least one memory; and at least one processor coupled to the at least one memory and configured to: receive, from a network device, a broadcast message indicating a first time to start receiving a plurality of subframes comprising a plurality of segments of a data package, a total number of the plurality of segments, and a total number of the plurality of subframes for the data package; switch, at the first time, from a subframe specific broadcast mode for receiving a specific subframe of subframes within a frame, to a pan subframe broadcast mode for receiving all the subframes within the frame; and receive, from the network device starting at the first time, the plurality of subframes comprising the plurality of segments.

Aspect 22. The wireless communication device of Aspect 21, wherein the at least one processor is configured to receive, from the network device, a broadcast command indicating a second time for the wireless communication device to apply the data package.

Aspect 23. The wireless communication device of Aspect 22, wherein the at least one processor is configured to apply, at the second time, the data package.

Aspect 24. The wireless communication device of any one of Aspects 21 to 23, wherein the data package is a firmware update (FWUP).

Aspect 25. The wireless communication device of any one of Aspects 21 to 24, wherein the at least one processor is configured to output, for transmission to the network device, a retransmission message indicating that the wireless communication device did not receive all of the total number of the plurality of segments.

Aspect 26. The wireless communication device of any one of Aspects 21 to 25, wherein the wireless communication device is an electronic shelf label (ESL) and the network device is an access point (AP).

Aspect 27. A method of wireless communication performed at a wireless communication device, the method comprising: receiving, by the wireless communication device from a network device, a broadcast message indicating a first time to start receiving a plurality of subframes comprising a plurality of segments of a data package, a total number of the plurality of segments, and a total number of the plurality of subframes for the data package; switching, by the wireless communication device at the first time, from a subframe specific broadcast mode for receiving a specific subframe of subframes within a frame, to a pan subframe broadcast mode for receiving all the subframes within the frame; and receiving, by the wireless communication device from the network device starting at the first time, the plurality of subframes comprising the plurality of segments.

Aspect 28. The method of Aspect 27, further comprising receiving, by the wireless communication device from the network device, a broadcast command indicating a second time for the wireless communication device to apply the data package.

Aspect 29. The method of Aspect 28, further comprising applying, by the wireless communication device at the second time, the data package.

Aspect 30. The method of any one of Aspects 27 to 29, wherein the data package is a firmware update (FWUP).

Aspect 31. The method of any one of Aspects 27 to 30, further comprising transmitting, by the wireless communication device to the network device, a retransmission message indicating that the wireless communication device did not receive all of the total number of the plurality of segments.

Aspect 32. The method of any one of Aspects 27 to 31, wherein the wireless communication device is an electronic shelf label (ESL) and the network device is an access point (AP).

Aspect 33. A non-transitory computer-readable storage medium comprising instructions stored thereon which, when executed by at least one processor, causes the at least one processor to perform operations according to any one of Aspects 11 to 20.

Aspect 34. An apparatus for wireless communication, comprising one or more means for performing operations according to any one of Aspects 11 to 20.

Aspect 35. A non-transitory computer-readable storage medium comprising instructions stored thereon which, when executed by at least one processor, causes the at least one processor to perform operations according to any one of Aspects 27 to 32.

Aspect 36. An apparatus for wireless communication, comprising one or more means for performing operations according to any one of Aspects 27 to 32.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A network device for wireless communication, the network device comprising:
   at least one memory; and
   at least one processor coupled to the at least one memory and configured to:
   divide a data package into a plurality of segments;
   output, for transmission to a plurality of wireless communication devices, a broadcast message indicating a first time for one or more wireless communication devices of the plurality of wireless communication devices to switch from a first broadcast mode wherein the one or more wireless communication devices receive messages transmitted only on a subframe to which the one or more wireless communication devices are subscribed, to a second broadcast mode wherein the one or more wireless communication devices receive messages on a total number of subframes associated with the data package, and to start receiving, in the second broadcast mode, a plurality of subframes comprising the plurality of segments, a total number of the plurality of segments, and a total number of the plurality of subframes for the data package; and
   output, for transmission to the plurality of wireless communication devices starting at the first time, the plurality of subframes comprising the plurality of segments.

2. The network device of claim 1, wherein each segment of the plurality of segments is transmitted within one subframe of the plurality of subframes repeatedly for a particular number of consecutive subframes.

3. The network device of claim 2, wherein one or more idle subframes are located in between transmissions of each segment of the plurality of segments.

4. The network device of claim 1, wherein the at least one processor is configured to output, for transmission to the plurality of wireless communication devices, a broadcast command indicating a second time for the plurality of wireless communication devices to apply the data package.

5. The network device of claim 1, wherein the at least one processor is configured to receive, from a wireless communication device of the plurality of wireless communication devices, a retransmission message indicating that the wireless communication device did not receive all of the total number of the plurality of segments.

6. The network device of claim 5, wherein the at least one processor is configured to:
   receive retransmission messages from at least one wireless communication device of the plurality of wireless communication devices; and
   output the plurality of subframes comprising the plurality of segments directly for retransmission to each of the at least one wireless communication device, based on a number of the at least one wireless communication device being less than a threshold value.

7. The network device of claim 5, wherein the at least one processor is configured to:
   receive retransmission messages from at least two wireless communication devices of the plurality of wireless communication devices; and
   output, for retransmission to the plurality of wireless communication devices, the broadcast message and the plurality of subframes comprising the plurality of segments, based on a number of the at least two wireless communication devices being greater than or equal to a threshold value.

8. The network device of claim 1, wherein the data package is a firmware update (FWUP).

9. The network device of claim 1, wherein the network device is an access point (AP), and each wireless communication device of the plurality of wireless communication devices is an electronic shelf label (ESL).

10. The network device of claim 1, wherein the first time is associated with a subframe number corresponding to a specific subframe at a future time.

11. The network device of claim 1, wherein the first broadcast mode comprises a subframe specific broadcast mode and the second broadcast mode comprises a pan subframe broadcast mode.

12. A method of wireless communication performed at a network device, the method comprising:
   dividing, by the network device, a data package into a plurality of segments;
   transmitting, by the network device to a plurality of wireless communication devices, a broadcast message indicating a first time for one or more wireless communication devices of the plurality of wireless communication devices to switch from a first broadcast mode wherein the one or more wireless communication devices receive message transmitted only on a subframe to which the one or more wireless communication devices are subscribed, to a second broadcast mode wherein the one or more wireless communication devices receive message on a total number of subframes associated with the data package, and to start receiving, in the second broadcast mode, a plurality of subframes comprising the plurality of segments, a total number of the plurality of segments, and a total number of the plurality of subframes for the data package; and
   transmitting, by the network device to the plurality of wireless communication devices starting at the first time, the plurality of subframes comprising the plurality of segments.

13. The method of claim 12, wherein each segment of the plurality of segments is transmitted within one subframe of the plurality of subframes repeatedly for a particular number of consecutive subframes.

14. The method of claim 13, wherein one or more idle subframes are located in between transmissions of each segment of the plurality of segments.

15. The method of claim 12, further comprising transmitting, by the network device to the plurality of wireless communication devices, a broadcast command indicating a second time for the plurality of wireless communication devices to apply the data package.

16. The method of claim 12, further comprising receiving, by the network device from a wireless communication device of the plurality of wireless communication devices, a retransmission message indicating that the wireless communication device did not receive all of the total number of the plurality of segments.

17. The method of claim 16, further comprising:
   receiving, by the network device, retransmission messages from at least one wireless communication device of the plurality of wireless communication devices; and
   retransmitting, by the network device, the plurality of subframes comprising the plurality of segments directly to each of the at least one wireless communication device, based on a number of the at least one wireless communication device being less than a threshold value.

18. The method of claim 16, further comprising:
   receiving, by the network device, retransmission messages from at least two wireless communication devices of the plurality of wireless communication devices; and
   retransmitting, by the network device to the plurality of wireless communication devices, the broadcast message and the plurality of subframes comprising the plurality of segments, based on a number of the at least two wireless communication devices being greater than or equal to a threshold value.

19. The method of claim 12, wherein the data package is a firmware update (FWUP).

20. The method of claim 12, wherein the network device is an access point (AP), and each wireless communication device of the plurality of wireless communication devices is an electronic shelf label (ESL).

21. The method of claim 12, wherein the first time is associated with a subframe number corresponding to a specific subframe at a future time.

22. A wireless communication device for wireless communication, the wireless communication device comprising:
   at least one memory; and
   at least one processor coupled to the at least one memory and configured to:
      receive, from a network device, a broadcast message indicating a first time to start receiving a plurality of subframes comprising a plurality of segments of a data package, a total number of the plurality of segments, and a total number of the plurality of subframes for the data package;
      switch, at the first time, from a subframe specific broadcast mode for receiving a specific subframe of subframes within a frame, to a pan subframe broadcast mode for receiving all the subframes within the frame; and receive, from the network device starting at the first time, the plurality of subframes comprising the plurality of segments.

23. The wireless communication device of claim 22, wherein the at least one processor is configured to receive, from the network device, a broadcast command indicating a second time for the wireless communication device to apply the data package.

24. The wireless communication device of claim 23, wherein the at least one processor is configured to apply, at the second time, the data package.

25. The wireless communication device of claim 22, wherein the data package is a firmware update (FWUP).

26. The wireless communication device of claim 22, wherein the at least one processor is configured to output, for transmission to the network device, a retransmission message indicating that the wireless communication device did not receive all of the total number of the plurality of segments.

27. The wireless communication device of claim 22, wherein the wireless communication device is an electronic shelf label (ESL) and the network device is an access point (AP).

28. A method of wireless communication performed at a wireless communication device, the method comprising:

receiving, by the wireless communication device from a network device, a broadcast message indicating a first time to start receiving a plurality of subframes comprising a plurality of segments of a data package, a total number of the plurality of segments, and a total number of the plurality of subframes for the data package;

switching, by the wireless communication device at the first time, from a subframe specific broadcast mode for receiving a specific subframe of subframes within a frame, to a pan subframe broadcast mode for receiving all the subframes within the frame; and receiving, by the wireless communication device from the network device starting at the first time, the plurality of subframes comprising the plurality of segments.

29. The method of claim 28, further comprising receiving, by the wireless communication device from the network device, a broadcast command indicating a second time for the wireless communication device to apply the data package.

30. The method of claim 29, further comprising applying, by the wireless communication device at the second time, the data package.

31. The method of claim 28, further comprising transmitting, by the wireless communication device to the network device, a retransmission message indicating that the wireless communication device did not receive all of the total number of the plurality of segments.

32. A wireless communication device for wireless communication, the wireless communication device comprising:

at least one memory; and at least one processor coupled to the at least one memory and configured to:

receive, from a network device, a broadcast message indicating a first time to start receiving a plurality of subframes comprising a plurality of segments of a data package, a total number of the plurality of segments, and a total number of the plurality of subframes for the data package;

switch, at the first time, from a first broadcast mode for receiving a specific subframe of subframes within a frame, to a second broadcast mode for receiving all the subframes within the frame; and receive, from the network device starting at the first time, the plurality of subframes comprising the plurality of segments.

* * * * *